United States Patent
Baniel et al.

(10) Patent No.: US 10,117,127 B2
(45) Date of Patent: Oct. 30, 2018

(54) METHODS, SYSTEMS, AND COMPUTER READABLE MEDIA FOR COMMUNICATING RADIO ACCESS NETWORK CONGESTION STATUS INFORMATION FOR LARGE NUMBERS OF USERS

(71) Applicant: Oracle International Corporation, Redwood Shores, CA (US)

(72) Inventors: Uri Baniel, Buffalo Grove, IL (US); Tarek Assali, Wellesley, MA (US); Joseph Wonseok Lee, Pleasanton, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/794,369

(22) Filed: Jul. 8, 2015

(65) Prior Publication Data

US 2017/0013502 A1    Jan. 12, 2017

(51) Int. Cl.
*H04W 28/02* (2009.01)
*H04L 12/14* (2006.01)
*H04L 12/801* (2013.01)

(52) U.S. Cl.
CPC ..... *H04W 28/0289* (2013.01); *H04L 12/1407* (2013.01); *H04L 47/11* (2013.01); *H04L 47/12* (2013.01)

(58) Field of Classification Search
CPC .... H04W 28/0289; H04L 47/12; H04L 47/11; H04L 12/1407
See application file for complete search history.

(56) References Cited

U.S. PATENT DOCUMENTS

| 4,310,727 A | 1/1982 | Lawser |
| 4,754,479 A | 6/1988 | Bicknell et al. |

(Continued)

FOREIGN PATENT DOCUMENTS

| CA | 2 716 544 A1 | 12/2010 |
| CN | 1964316 A | 5/2007 |

(Continued)

OTHER PUBLICATIONS

Non-Final Office Action for U.S. Appl. No. 14/107,818 (dated Sep. 18, 2015).

(Continued)

*Primary Examiner* — Rina C Pancholi
(74) *Attorney, Agent, or Firm* — Jenkins, Wilson, Taylor & Hunt, P.A.

(57) ABSTRACT

Methods, systems, and computer readable media for communicating RAN congestion status information for large numbers of users are disclosed. In one example, a method for communicating RAN congestion status information for a large number of users includes steps performed PCRF including one or more processors. The method further includes receiving a user-specific message from an RCAF. The method further includes determining that the user-specific message indicates that one or more eNodeBs monitored by the RCAF is congested for a plurality of users using the one or more eNodeBs for radio access to a telecommunications network. The method further includes, in response to determining that the user-specific message indicates that the one or more eNodeBs are congested, performing one or more actions to mitigate the congestion.

17 Claims, 4 Drawing Sheets

(56) References Cited

U.S. PATENT DOCUMENTS

| | | |
|---|---|---|
| 5,008,929 A | 4/1991 | Olsen et al. |
| 5,089,954 A | 2/1992 | Rago |
| 5,237,604 A | 8/1993 | Ryan |
| 5,247,571 A | 9/1993 | Kay et al. |
| 5,251,248 A | 10/1993 | Tokunaga et al. |
| 5,400,390 A | 3/1995 | Salin |
| 5,422,941 A | 6/1995 | Hasenauer et al. |
| 5,423,068 A | 6/1995 | Hecker |
| 5,430,719 A | 7/1995 | Weisser, Jr. |
| 5,442,683 A | 8/1995 | Hoogeveen |
| 5,455,855 A | 10/1995 | Hokari |
| 5,457,736 A | 10/1995 | Cain et al. |
| 5,481,603 A | 1/1996 | Gutierrez et al. |
| 5,502,726 A | 3/1996 | Fischer |
| 5,504,804 A | 4/1996 | Widmark et al. |
| 5,526,400 A | 6/1996 | Nguyen |
| 5,579,372 A | 11/1996 | Aström |
| 5,590,398 A | 12/1996 | Matthews |
| 5,594,942 A | 1/1997 | Antic et al. |
| 5,623,532 A | 4/1997 | Houde et al. |
| 5,689,548 A | 11/1997 | Maupin et al. |
| 5,706,286 A | 1/1998 | Reiman et al. |
| 5,711,002 A | 1/1998 | Foti |
| 5,819,178 A | 10/1998 | Cropper |
| 5,822,694 A | 10/1998 | Coombes et al. |
| 5,832,382 A | 11/1998 | Alperovich |
| 5,854,982 A | 12/1998 | Chambers et al. |
| 5,878,347 A | 3/1999 | Joensuu et al. |
| 5,878,348 A | 3/1999 | Foti |
| 5,890,063 A | 3/1999 | Mills |
| 5,953,662 A | 9/1999 | Lindquist et al. |
| 5,953,663 A | 9/1999 | Maupin et al. |
| 5,983,217 A | 11/1999 | Khosravi-Sichannie et al. |
| 6,006,098 A | 12/1999 | Rathnasabapathy et al. |
| 6,011,803 A | 1/2000 | Bicknell et al. |
| 6,014,557 A | 1/2000 | Morton et al. |
| 6,018,657 A | 1/2000 | Kennedy, III et al. |
| 6,038,456 A | 3/2000 | Colby et al. |
| 6,049,714 A | 4/2000 | Patel |
| 6,097,960 A | 8/2000 | Rathnasabapathy et al. |
| 6,115,463 A | 9/2000 | Coulombe et al. |
| H1895 H | 10/2000 | Hoffpauir et al. |
| 6,128,377 A | 10/2000 | Sonnenberg |
| 6,137,806 A | 10/2000 | Martinez |
| 6,138,016 A | 10/2000 | Kulkarni et al. |
| 6,138,017 A | 10/2000 | Price et al. |
| 6,138,023 A | 10/2000 | Agarwal et al. |
| 6,144,857 A | 11/2000 | Price et al. |
| 6,148,204 A | 11/2000 | Urs et al. |
| 6,192,242 B1 | 2/2001 | Rollender |
| 6,205,210 B1 | 3/2001 | Rainey et al. |
| 6,226,517 B1 | 5/2001 | Britt et al. |
| 6,236,365 B1 | 5/2001 | LeBlanc et al. |
| 6,263,212 B1 | 7/2001 | Ross et al. |
| 6,278,697 B1 | 8/2001 | Brody et al. |
| 6,308,075 B1 | 10/2001 | Irten et al. |
| 6,324,183 B1 | 11/2001 | Miller et al. |
| 6,327,350 B1 | 12/2001 | Spangler et al. |
| 6,377,674 B1 | 4/2002 | Chong et al. |
| 6,377,799 B1 | 4/2002 | Hameleers et al. |
| 6,411,632 B2 | 6/2002 | Lindgren et al. |
| 6,424,832 B1 | 7/2002 | Britt et al. |
| 6,463,055 B1 | 10/2002 | Lupien et al. |
| 6,505,046 B1 | 1/2003 | Baker |
| 6,515,997 B1 | 2/2003 | Feltner et al. |
| 6,529,524 B1 | 3/2003 | Liao et al. |
| 6,535,746 B1 | 3/2003 | Yu et al. |
| 6,539,077 B1 | 3/2003 | Ranalli et al. |
| 6,560,216 B1 | 5/2003 | McNiff et al. |
| 6,560,456 B1 | 5/2003 | Lohtia et al. |
| 6,574,481 B1 | 6/2003 | Rathnasabapathy et al. |
| 6,577,723 B1 | 6/2003 | Mooney |
| 6,594,258 B1 | 7/2003 | Larson et al. |
| 6,611,516 B1 | 8/2003 | Pirkola et al. |
| 6,643,511 B1 | 11/2003 | Rune et al. |
| 6,680,953 B1 | 1/2004 | Kim |
| 6,681,009 B1 | 1/2004 | Graf et al. |
| 6,683,881 B1 | 1/2004 | Mijares et al. |
| 6,684,073 B1 | 1/2004 | Joss et al. |
| 6,731,926 B1 | 5/2004 | Link, II et al. |
| 6,738,636 B2 | 5/2004 | Lielbriedis |
| 6,748,057 B2 | 6/2004 | Ranalli et al. |
| 6,775,737 B1 | 8/2004 | Warkhede et al. |
| 6,795,546 B2 | 9/2004 | Delaney et al. |
| 6,795,701 B1 | 9/2004 | Baker et al. |
| 6,839,421 B2 | 1/2005 | Ferraro Esparza et al. |
| 6,871,070 B2 | 3/2005 | Ejzak |
| 6,917,612 B2 | 7/2005 | Foti et al. |
| 6,950,441 B1 | 9/2005 | Kaczmarczyk et al. |
| 6,967,956 B1 | 11/2005 | Tinsley et al. |
| 6,990,089 B2 | 1/2006 | Benedyk et al. |
| 7,010,002 B2 | 3/2006 | Chow et al. |
| 7,027,582 B2 | 4/2006 | Khello et al. |
| 7,043,000 B2 | 5/2006 | Delaney et al. |
| 7,079,524 B2 | 7/2006 | Bantukul et al. |
| 7,079,853 B2 | 7/2006 | Rathnasabapathy et al. |
| 7,170,982 B2 | 1/2007 | Li et al. |
| 7,221,952 B2 | 5/2007 | Cho et al. |
| 7,286,516 B2 | 10/2007 | Delaney et al. |
| 7,286,839 B2 | 10/2007 | McCann et al. |
| 7,298,725 B2 | 11/2007 | Rune |
| 7,383,298 B2 | 6/2008 | Palmer et al. |
| 7,403,537 B2 | 7/2008 | Allison et al. |
| 7,466,807 B2 | 12/2008 | McCann et al. |
| 7,633,872 B2 | 12/2009 | Pitcher et al. |
| 7,633,969 B2 | 12/2009 | Caugherty et al. |
| 7,706,343 B2 | 4/2010 | Delaney et al. |
| 7,916,685 B2 | 3/2011 | Schaedler et al. |
| 7,940,904 B2 | 5/2011 | Cai et al. |
| 7,961,685 B2 | 6/2011 | Suh et al. |
| 7,996,007 B2 | 8/2011 | Bantukul |
| 7,996,541 B2 | 8/2011 | Marathe et al. |
| 8,023,926 B2 | 9/2011 | Cai et al. |
| 8,045,983 B2 | 10/2011 | Bantukul |
| 8,050,391 B1 | 11/2011 | Andreasen et al. |
| 8,219,697 B2 | 7/2012 | Langen et al. |
| 8,468,267 B2 | 6/2013 | Yigang et al. |
| 8,504,630 B2 | 8/2013 | Craig et al. |
| 8,543,118 B1 | 9/2013 | Mangal et al. |
| 8,613,073 B2 | 12/2013 | McCann et al. |
| 8,750,126 B2 | 6/2014 | McCann et al. |
| 8,787,174 B2 | 7/2014 | Riley et al. |
| 8,958,306 B2 | 2/2015 | McCann et al. |
| 9,179,008 B2 | 11/2015 | Goldner et al. |
| 9,209,982 B2 | 12/2015 | Menditto |
| 9,231,774 B2 | 1/2016 | Cai et al. |
| 9,369,910 B2 | 6/2016 | Rajagopalan et al. |
| 9,647,986 B2 | 5/2017 | McCann et al. |
| 9,935,922 B2 | 4/2018 | Nas et al. |
| 2001/0030957 A1 | 10/2001 | McCann et al. |
| 2001/0040957 A1 | 11/2001 | McCann et al. |
| 2001/0053694 A1 | 12/2001 | Igarashi et al. |
| 2002/0057669 A1 | 5/2002 | Joung |
| 2002/0105969 A1 | 8/2002 | Benedyk et al. |
| 2002/0147845 A1 | 10/2002 | Sanchez-Herrero et al. |
| 2002/0173320 A1 | 11/2002 | Aitken et al. |
| 2003/0003928 A1 | 1/2003 | Marjelund et al. |
| 2003/0007482 A1 | 1/2003 | Khello et al. |
| 2003/0026289 A1 | 2/2003 | Mukherjee et al. |
| 2003/0081754 A1 | 5/2003 | Esparza et al. |
| 2003/0109271 A1 | 6/2003 | Lewis et al. |
| 2003/0193967 A1 | 10/2003 | Fenton et al. |
| 2003/0227899 A1 | 12/2003 | McCann |
| 2004/0003114 A1 | 1/2004 | Adamczyk |
| 2004/0034699 A1 | 2/2004 | Gotz et al. |
| 2004/0081206 A1 | 4/2004 | Allison et al. |
| 2004/0082332 A1 | 4/2004 | McCann et al. |
| 2004/0087300 A1 | 5/2004 | Lewis |
| 2004/0142707 A1 | 7/2004 | Midkiff et al. |
| 2004/0198351 A1 | 10/2004 | Knotts |
| 2004/0202187 A1 | 10/2004 | Kelly et al. |
| 2004/0246965 A1 | 12/2004 | Westman et al. |
| 2005/0107091 A1 | 5/2005 | Vannithamby et al. |
| 2005/0122945 A1 | 6/2005 | Hurtta |

(56) References Cited

U.S. PATENT DOCUMENTS

| | | |
|---|---|---|
| 2006/0067338 A1 | 3/2006 | Hua et al. |
| 2006/0123477 A1 | 6/2006 | Raghavan et al. |
| 2006/0136557 A1 | 6/2006 | Schaedler et al. |
| 2006/0225128 A1 | 10/2006 | Aittola et al. |
| 2007/0067794 A1 | 3/2007 | Russell et al. |
| 2007/0195788 A1 | 8/2007 | Vasamsetti et al. |
| 2007/0232301 A1 | 10/2007 | Kueh |
| 2008/0025230 A1 | 1/2008 | Patel et al. |
| 2008/0160954 A1 | 7/2008 | Agarwal et al. |
| 2008/0165687 A1* | 7/2008 | Wang .................. H04L 47/10 370/232 |
| 2008/0167035 A1 | 7/2008 | Buckley et al. |
| 2009/0080410 A1 | 3/2009 | Aoyagi et al. |
| 2009/0109845 A1 | 4/2009 | Andreasen et al. |
| 2009/0185494 A1 | 7/2009 | Li et al. |
| 2009/0193071 A1 | 7/2009 | Qiu et al. |
| 2009/0264096 A1 | 10/2009 | Cai et al. |
| 2009/0270099 A1 | 10/2009 | Gallagher et al. |
| 2010/0042525 A1 | 2/2010 | Cai et al. |
| 2010/0048161 A1 | 2/2010 | He et al. |
| 2010/0091671 A1 | 4/2010 | Lidstrom et al. |
| 2010/0121960 A1 | 5/2010 | Baniel et al. |
| 2010/0177780 A1 | 7/2010 | Ophir et al. |
| 2010/0202383 A1 | 8/2010 | Sugimoto et al. |
| 2010/0217877 A1 | 8/2010 | Willars et al. |
| 2010/0284278 A1 | 11/2010 | Alanara |
| 2010/0299451 A1 | 11/2010 | Yigang et al. |
| 2010/0304710 A1 | 12/2010 | Sharma et al. |
| 2011/0014939 A1 | 1/2011 | Ravishankar et al. |
| 2011/0035495 A1 | 2/2011 | Ekström et al. |
| 2011/0038287 A1 | 2/2011 | Agarwal et al. |
| 2011/0067085 A1 | 3/2011 | Brouard et al. |
| 2011/0116382 A1 | 5/2011 | McCann et al. |
| 2011/0122886 A1 | 5/2011 | Willars et al. |
| 2011/0126277 A1 | 5/2011 | McCann et al. |
| 2011/0138066 A1 | 6/2011 | Kopplin et al. |
| 2011/0158090 A1 | 6/2011 | Riley et al. |
| 2011/0188397 A1 | 8/2011 | McCann et al. |
| 2011/0199903 A1 | 8/2011 | Cuervo |
| 2011/0202613 A1 | 8/2011 | Craig et al. |
| 2011/0202614 A1 | 8/2011 | Graig et al. |
| 2011/0225281 A1 | 9/2011 | Riley et al. |
| 2011/0289162 A1 | 11/2011 | Furlong et al. |
| 2011/0295978 A1 | 12/2011 | Pazos et al. |
| 2011/0320622 A1 | 12/2011 | Cutler et al. |
| 2012/0014332 A1 | 1/2012 | Smith et al. |
| 2012/0131165 A1 | 5/2012 | Baniel et al. |
| 2012/0191847 A1 | 7/2012 | Nas et al. |
| 2012/0213072 A1 | 8/2012 | Kotecha et al. |
| 2012/0250573 A1 | 10/2012 | Kulasingam et al. |
| 2012/0250613 A1 | 10/2012 | Robinson et al. |
| 2012/0290452 A1 | 11/2012 | Pancorbo Marcos et al. |
| 2013/0039176 A1 | 2/2013 | Kanode et al. |
| 2013/0070594 A1 | 3/2013 | Garcia Martin et al. |
| 2013/0079006 A1 | 3/2013 | Cho et al. |
| 2013/0114404 A1 | 5/2013 | Yang |
| 2013/0160058 A1 | 6/2013 | Albal et al. |
| 2013/0163424 A1* | 6/2013 | Goerke ................. H04W 24/02 370/235 |
| 2013/0163429 A1 | 6/2013 | Dunstan et al. |
| 2013/0177146 A1 | 7/2013 | Schneider et al. |
| 2013/0262308 A1 | 10/2013 | Cai et al. |
| 2013/0265911 A1 | 10/2013 | Kulaingam et al. |
| 2014/0011512 A1 | 1/2014 | Hu et al. |
| 2014/0018067 A1 | 1/2014 | Rajagopalan et al. |
| 2014/0022897 A1 | 1/2014 | Rajagopalan et al. |
| 2014/0040975 A1 | 2/2014 | Raleigh et al. |
| 2014/0181952 A1 | 6/2014 | McCann et al. |
| 2015/0011182 A1 | 1/2015 | Goldner et al. |
| 2015/0195150 A1 | 7/2015 | Ritter et al. |
| 2015/0282242 A1 | 10/2015 | Merino Vazquez et al. |
| 2016/0014635 A1* | 1/2016 | Rasanen ................. H04L 47/14 370/230 |
| 2016/0050585 A1* | 2/2016 | Shan .................... H04B 7/0456 370/235 |
| 2016/0073282 A1* | 3/2016 | Speicher ........... H04W 28/0284 370/230 |
| 2016/0100326 A1* | 4/2016 | Chandramouli ........ H04W 8/26 370/241.1 |
| 2016/0269929 A1 | 9/2016 | Livanos et al. |
| 2018/0146503 A1 | 5/2018 | Castro Castro et al. |

FOREIGN PATENT DOCUMENTS

| | | | |
|---|---|---|---|
| CN | 101841766 A | 9/2010 | |
| CN | 102215469 A | 10/2011 | |
| CN | 102223663 A | 10/2011 | |
| CN | ZL 201080056996.8 | 4/2015 | |
| CN | ZL201080064945.X | 11/2015 | |
| CN | 103460648 B | 4/2017 | |
| EP | 0 512 962 A2 | 11/1992 | |
| EP | 0 936 825 A3 | 8/1999 | |
| EP | 0 944 276 A1 | 9/1999 | |
| EP | 1 054 529 A2 | 11/2000 | |
| EP | 0 857 399 B1 | 5/2004 | |
| EP | 1 371 246 B1 | 7/2008 | |
| EP | 1 314 324 B1 | 8/2008 | |
| EP | 1 988 680 A1 | 11/2008 | |
| EP | 2 093 931 A1 | 8/2009 | |
| EP | 1 847 076 B1 | 2/2012 | |
| EP | 2 477 427 B1 | 3/2013 | |
| EP | 2819455 A1 * | 12/2014 | ........ H04W 28/0289 |
| EP | 2 520 045 B1 | 7/2015 | |
| IL | 219214 | 10/2015 | |
| JP | 03-270398 | 2/1991 | |
| JP | 10-023509 | 1/1998 | |
| JP | 2000-125341 A | 4/2000 | |
| JP | 2001-054164 A | 2/2001 | |
| JP | 201 1-501 886 | 1/2011 | |
| JP | 2013540380 A | 10/2013 | |
| KR | 10-2004-0107271 A | 12/2004 | |
| WO | WO 1995/012292 A2 | 5/1995 | |
| WO | WO 1996/011557 | 4/1996 | |
| WO | WO 1997/033441 A1 | 2/1997 | |
| WO | WO 1998/056195 | 12/1998 | |
| WO | WO 1999/011087 A2 | 3/1999 | |
| WO | WO 1999/057926 | 11/1999 | |
| WO | WO 2000/016583 A1 | 3/2000 | |
| WO | WO 02/056618 A2 | 7/2002 | |
| WO | WO 2004/006534 A1 | 1/2004 | |
| WO | WO 2004/075507 A2 | 9/2004 | |
| WO | WO 2007/045991 A1 | 7/2008 | |
| WO | WO 2008/087633 A2 | 7/2008 | |
| WO | WO 2009/058067 A1 | 5/2009 | |
| WO | WO 2009/070179 A1 | 6/2009 | |
| WO | WO 2009/149341 A2 | 12/2009 | |
| WO | WO 2011/047382 A2 | 4/2011 | |
| WO | WO 2011/082035 A2 | 7/2011 | |
| WO | WO 2011/100621 A2 | 8/2011 | |
| WO | WO 2012/083795 A1 | 6/2012 | |
| WO | WO 2012/100057 A2 | 7/2012 | |
| WO | WO 2014/014829 A1 | 1/2014 | |
| WO | WO 2014185987 A1 * | 11/2014 | ............ H04W 8/12 |
| WO | WO 2014/014829 | 1/2018 | |

OTHER PUBLICATIONS

Non-Final Office Action for U.S. Appl. No. 13/354,149 (dated Jul. 16, 2015).

3GPP, "3rd Generation Partnership Project; Technical Specification Group Core Network and Terminals; Nq and Nq' Application Protocol (Nq-AP); Stage 3 (Release 13),"3GPP TS 29.405 V0.3.0 (Feb. 2015).

3GPP, "3rd Generation Partnership Project; Technical Specification Group Services and System Apects; Study on system enhancements for user plane congestion management (Release 13)," 3GPP TR 23.705 V1.2.0 (Nov. 2014).

3GPP, "3rd Generation Partnership Project; Technical Specification Group Core Network and Terminals; Policy and Charging Control over Np reference point (Release 13)," 3GPP TS 29.217 V1.0.0 (Nov. 2014).

(56) References Cited

OTHER PUBLICATIONS

Notice of Allowance and Fee(s) Due for U.S. Appl. No. 13/026,133 (dated Feb. 3, 2014).
Communication of European Publication Number and Information on the Application of Article 67(3) EPC for European Patent Application No. 12737038.5 (dated Oct. 30, 2013).
Non-Final Office Action for U.S. Appl. No. 13/026,133 (dated Aug. 19, 2013).
Notice of Allowance and Fee(s) Due for U.S. Appl. No. 12/906,998 (dated Jul. 31, 2013).
Non-Final Office Action for U.S. Appl. No. 12/906,998 (dated Jan. 2, 2013.
Notification of Transmittal of the International Search Report and the Written Opinion of the International Searchig Aughtority, or the Declaration for International Applcation No. PCT/US2012/021874 (dated Sep. 21, 2012).
Final Official Action for U.S. Appl. No. 12/906,998 (dated Mar. 29, 2012).
Notification of Transmittal of the International Search Report and the Written Opinion of the International Searching Authority, or the Declaration for International Application No. PCT/US2011/024637 (dated Oct. 27, 2011).
Non-Final Official Action for U.S. Appl. No. 12/906,998 (dated Sep. 21, 2011).
Traffix Systems, "Datasheet; Traffix Signaling Delivery Controller (SDC)," pp. 1-5 (May 2011).
"Ericsson Unified Number Portability," (Downloaded from the Internet on Jan. 24, 2011).
Tsou et al., "Realm-Based Redirection in Diameter," draft-ietf-dime-realm-based-redirect-03, RFC 3588, pp. 1-6 (Jul. 12, 2010).
Znaty, "Diameter, GPRS, (LTE + ePC = EPS), IMS, PCC and SDM," EFORT (May 2010). (Part 1 of 2, pp. 1-229).
Znaty, "Diameter, GPRS, (LTE + ePC = EPS), ISM, PCC and SDM," EFORT (May 2010). (Part 2 of 2, pp. 230-460).
"3rd Generation Partnership Project; Technical Specification Group Core Network and Terminals; Policy and Charging Control signalling flows and Quality of Service (QoS) parameter mapping (Release 9),"3GPP TS 29.213, V9.2.0, pp. 1-129 (Mar. 2010).
"Mapping Diameter Interfaces to Functionality in 3GPP/3GPP2 IMS Architecture," Whitepaper by Traffix Systems, pp. 1-10 (Copyright 2010).
Korhonen et al., "Clarifications on the Routing of Diameter Requests Based on the Username and the Realm," RFC 5729, pp. 1-9 (Dec. 2009).
3GPP, "3rd Generation Partnership Project; Technical Specification Group Services and System Aspects; Generic Authentication Architecture Generic Bootstrapping Architecture (GAA); (Release 9)," 3GPP TS 33.220 V9.2.0 (Dec. 2009).
3GPP, "3rd Generation Partnership Project; Technical Specification Group Service and System Aspects; Telecommunication Management; Charging Management; Diameter Charging Applications (Release 9)," 3GPP TS 32.299 V9.2.0 (Dec. 2009).
3GPP, "3rd Generation Partnership Project; Technical Specification Group Service and System Aspects; Telecommnication Management; Charging Mangement; Online Charging System (OCS): Applications and Interfaces (Release 9)," 3GPP TS 32.296 V9.1.0 (Dec. 2009).
3GPP, "3rd Generation Partnership Project; Technical Specification Group Core Network and Terminals; Diameter-based Protocols Usage and Recommendations in 3GPP (Release 9)," 3GPP TR 29.909 V9.0.0 (Dec. 2009).
3GPP, "3rd Generation Partnership Project; Technical Specification Group Core Network and Terminals; Sh Interface Based on the Diameter Protocol; Protocol Details (Release 9)," 3GPP TS 29.329 V9.0.0 (Dec. 2009).
3GPP, "3rd Generation Partnership Project; Technical Specification Group Core Network and Terminals; IP Multimedia (IM) Subsystem Sh Interface; Signalling Flows and Message Contents (Release 9);" 3GPP TS 29.328 V9.0.0 (Dec. 2009).
3GPP, "3rd Generation Partnership Project; Technical Specification Group Core Network and Terminals; 3GPP System to Wireless Local Area Network (WLAN) Interworking; Stage 3 (Release 9),"3GPP TS 29.234 V9.0.0 (Dec. 2009).
3GPP, "3rd Generation Partnership Project; Technical Specification Group Core Network and Terminals; Cx and Dx Interfaces Based on the Diameter Protocol; Protocol Details (Release 9)," 3 GPP TS 29.229 V9.0.0 (Dec. 2009).
3GPP, "3rd Generation Partnership Project; Technical Specification Group Core Network and Terminals; IP Multimedia (IM) Subsystem Cx and Dx Interfaces; Signalling Flows and Message Contents (Release 9)," 3GPP TS 29.228 V9.0.0 (Dec. 2009).
3GPP, "3rd Generation Partnership Project; Technical Specification Group Core Network and Terminals; Policy and Charging Control Over Rx Reference Point (Release 9)," 3GPP TS 29.214 V9.2.0 (Dec. 2009).
3GPP, "3rd Generation Partnership Project; Technical Specification Group Core Network and Terminals; Policy and Charging Control over Gx Reference Point (Release 9)," 3GPP TS 29.212 V9.1.0 (Dec. 2009).
3GPP, "3rd Generation Partnership Project; Technical Specification Group Services and System Aspects; Policy and Charging Control Architecture (Release 9)," 3GPP TS 23.203 V9.3.0 (Dec. 2009).
Tsou et al., "Realm-Based Redirection in Diameter," Internet Engineering Task Foce, draft-ietf-dime-realm-based-redirect-02, pp. 1-7 (Oct. 27, 2009).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 8)," 3GPP TS 29.272, V8.4.0, pp. 1-71 (Sep. 2009).
"3rd Generation Partnership Project; Technical Specification Group Seervices and System Aspects; Policy and charging control architecture (Release 8)," 3GPP TS 23.203, V8.1.1, pp. 1-87 (Mar. 2008).
"IP Multimedia Subsystem," printout from wikipedia.org, Wikimedia Foundation, Inc. (May 29, 2007).
"HP OpenCall Home Subscriber Server Software—Data Sheet", 4AA0-3360ENW Rev. 2, Hewlett-Packard Development Company, L.P. (Jul. 2006).
3GPP, "3rd Generation Partnership Project; Technical Specification Group Service and System Aspects; Telecommunication Management; Charging Management; Charging Data Description for the IP Multimedia Subsystem (IMS) (Release 5)," 3GPP TS 32.225 V5.11.0 (Mar. 2006).
Tschofenig et al., "Securing the Nesxt Steps in Signaling (NSIS) Protocol Suite," International Journal of Internet Protocol Technology, vol. 1, pp. 1-14 (2006).
Supplemental Notice of Allowability for U.S. Appl. No. 09/735,142 (dated Dec. 5, 2005).
Communication pursuant to Article 96(2) EPC in European Patent Application No. 01989213.2 (dated Nov. 7, 2005).
3GPP, "3rd Generation Partnership Project; Technical Specification Group Core Network and Terminals; Policy Control Over Go Interface (Release 6)," 3GPP TS 29.207 V6.5.0 (Sep. 2005).
Hakala et al., "Diameter Credit-Control Application," Network Working Group RFC 4006, pp. 1-107 (Aug. 2005).
Stiemerling et al., "NAT/Firewall NSIS Signaling Layer Protocol (NSLP)," draft-ietf-nsis-nslp-natfw-06, pp. 1-70 (May 16, 2005).
Communication pursuant to Article 96(2) EPC for European Patent Application No. 01989213.2 (dated Mar. 7, 2005).
Notice of Allowance and Fee(s) Due for U.S. Appl. No. 09/735,142 (dated Feb. 14, 2005).
Notification of Transmittal of International Preliminary Report on Patentability for International Application No. PCT/US01/48269 (dated Jan. 11, 2005).
Communication under Rule 112 EPC for European Patent Application No. 01989213.2 (dated Nov. 17, 2004).
"Cisco IP Transfer Point as the Signaling Gateway for the Cisco BTS 10200 Softswitch," Cisco Systems, Inc., pp. 1-10 (Summer 2004).
"Cisco IP Transfer Point as the Signaling Gateway for the Cisco PGW 2200 Softswitch," Cisco Systems, Inc., pp. 1-11 (Summer 2004).

(56) References Cited

OTHER PUBLICATIONS

"Next-Generation Signaling Transports Cisco IP Transfer Point," Cisco Systems, Inc., pp. 1-27 (Summer 2004).
Non-Final Office Action for U.S. Appl. No. 09/735,142 (dated May 27, 2004).
"A Study in Mobile Messaging: The Evolution of Messaging in Mobile Networks, and How to Efficiently and Effectively Manage the Growing Messaging Traffic," White Paper, Cisco Systems, Inc., pp. 1-6 (Spring 2004).
Walker, "The IP Revolution in Mobile Messaging," Packet, Cisco Systems Users Magazine, vol. 16, No. 1, pp. Cover; 73-74; and 89 (First Quarter 2004).
"Cisco ITP Multilayer Routing (MLR) SMS MO Routing Requirements," Cisco Systems, Inc., p. 1 (Copyright 2004).
"Cisco Signaling Gateway Manager Release 3.2 for Cisco IP Transfer Point," Cisco Systems, Inc., pp. 1-9 (Copyrigh 1992-2004).
"Solutions for Mobile Network Operators," Cisco Systems, Inc., pp. 1-8 (Copyright 1992-2004).
Calhoun et al., "Diameter Base Protocol," RFC 3588, pp. 1-147 (Sep. 2003).
Moodie, "Agilent acceSS7: White Paper," Agilent Technologies, pp. 1-14 (Apr. 1, 2003).
"Cisco IP Transfer Point," Cisco Systems, Inc., pp. 1-10 (Copyright 1992-2003).
"Cisco IP Transfer Point Multilayer Short Message Service Routing Solution," Cisco Systems, Inc., pp. 1-6 (Copyright 1992-2003).
"Cisco ITP MAP Gateway for Public WLAN Slm Authentication and Authorization," Cisco Systems, Inc., pp. 1-13 (Copyright 1992-2003).
Loshin, "19.4: Network Address Translation," TCP/IP Clearly Explained, Fourth Edition, Morgan Kaufman Publishers, pp. 435-437 (2003).
Notification of Transmittal of the International Search Report or the Declaration in International Application No. PCT/US01/48269 (dated May 22, 2003).
Barry, "A Signal for Savings," Packet, Cisco Systems Users Magazine, vol. 14, No. 4, pp. Cover; 19-21; and 81 (Fourth Quarter 2002).
"Agilent Technologies and Cisco Systems SS7 Over IP White Paper," Cisco Systems, Inc. and Agilent and Technologies, pp. 1-6 (Copyrigh 2002—Printed in the UK Feb. 1, 2002).
"Cisco IP Transfer Point: MTP3 User Adaptation (M3UA) and SCCP User Adaptation (SUA) Signaling Gateway," Cisco Systems, Inc., pp. 1-14 (Copyright 2002).
"Cisco SS7 Port Adapter for the Cisco 7500 Versatile Interface Processor and 7200 VXR Routers Provide High-Density SS7 Agrregation," Cisco Systems, Inc., pp. 1-5 (Copyright 1992-2002).
"Next-Generation SS7 Networks with the Cisco IP Transfer Point," Cisco Systems, Inc., pp. 1-14 (Copyright 1992-2002).
The attached email dated Oct. 20, 2001 and PowerPoint presentation dated Oct. 24, 2001 disclose an MSISDN-based auto-provisioning solution proposed by a customer of the assignee of the present application.
"Agilent acceSS7 Business intelligence," Agilent Technologies, pp. 1-6 (Copyright 2001—Printed in the UK Nov. 30, 2001).
"Cisco IP Transfer Point (ITP) Network Management Product Presentation," Cisco Systems, Inc., pp. 1-20 (Copyright 2001).
"Networkers," Cisco Systems, Inc., pp. 1-60 (Copyright 2001).
"Cisco SS7 Signaling Offload," Cisco Systems, Inc., pp. 1-33 (Copyright 1992-2001).
Sidebottom et al., "SS7 MTP3-User Adaptation Layer (M3UA)," Internet Draft, Network Working Group, pp. 1-79 (Nov. 2000).
Rockhold, "Or," Wireless Review, p. 22, 23, 26, 28, 30, 32, (Aug. 15, 2000).
Subbiah et al., "Transport Architecture Evolution in UMTS/IMT-2000 Cellular Networks," International Journal of Communication Systems, pp. 371-385 (Aug. 11, 2000).
Raivio, "Transport Protocol Evolution in 3G Networks," World Telecommunications Congress/ISS2000, pp. 1-11 (Aug. 5, 2000).
"GPRS: General Packet Radio Service," Usha Communications Technology, pp. 1-23 (Jun. 2000).

Loughney et al., "SS7 SCCP—Usser Adaptation Layer (SUA)," Internet draft, draft-loughney-sigtran-sua-00.txt, IETF Enginnering Task Force, pp. 1-53 (Mar. 8, 2000).
"Topsail Beach-SS7 Over IP—" Cisco Systems, Inc., pp. 1-16 (Copyright 1999).
Ong et al., "Framework Architecture for Signaling Transport," Network Working Group, RFC 2719, pp. 1-24 (Oct. 1999).
Sprague et al., "Transport Adapter Layer Interface," Tekelec, Internet Draft, pp. 1-30 (May 28, 1999).
Michael McGrew, "Transport SS7 Signaling Over IP," Lucent Technologies Inc., pp. 1-8 (Nov. 1998).
Smith, "Number Portability Pileup," Telephony, p. 22, 24, 26, (Jan. 6, 1997).
Jain et al., "Phone Number Portability for PCS Systems with ATM Backbones Using Distributed Dynamic Hashing," IEEE, vol. 15 (No. 1), p. 96-105, (Jan. 1997).
Heinmiller, "Generic Requirements for SCP Application and GTT Function for Number Portability," Illinois Number Portability Workshop, p. 1-50, (Sep. 4, 1996).
International Telecommunication Union, "Series Q: Switching and Signalling: Specifications of Signalling Systems No. 7—Signalling Connection Control Part," p. 11-16, (Jul. 1996).
Rice, "SS7 Networks in a PCS World," Telephony, pp. 138, 140 142, 144, 146, (Jun. 24, 1996).
Tekelec, "Eagle STP Planning Guide", Eagle Network Switching Division, (No. 3), p. i-vii, 1-64, A1-A2, B1-2, (May 1996).
Anonymous, "Generic Switching and Signaling Requirements for Number Portability," AT&T Network Systems, No. 1, p. 1-75, (Feb. 2, 1996).
ETSI, Digital Cellular Telecommunications System (Phase 2+); Milbe Application Part (MAP) Specification, Global System for Mobile Communications, pp. 112-114 (1996).
Jain, et al., "A hashing Scheme for Phone Number Portability in PCS Systems with ATM Backbones," Bell Communications Research, p. 593-597 (1996).
Bishop, "Freeing the Network for Competition," Telecommunications, p. 75-80, (Apr. 1995).
Anonymous, "Zeichengabesysteme—Eine neue Generation für ISDN und intelligente Netze," Zeichengabesystem, Medien-Institut Bremen, p. iz-xi; 170-176, (Feb. 17, 1995).
Giordano et al., "PCS Number Portability," IEEE, p. 1146-1150, (Sep. 1994).
Bellcore, "Signaling Transfer Point (STP) Generic Requirements," Bell Communications Research, No. 1, p. ii-xxii, 4-84-J14, (Jun. 1994).
Telcordia Technologies, "CCS Network Interface Specification (CCSNIS) Supporting SCCP and TCAP," Bell Communications Research, p. ii-xii, 1-1-C-22, (Mar. 1994).
Buckles, "Very High Capacity Signaling Trnsfer Point for Intelligent Network Servcies," DSC Communciations Corporation, p. 1308-1311, (1988).
"Diameter Overview," referenced from www.ulticom.com/html/products/signalware-diameter-reference-guide.asp (Publication date unknown).
"Chapter 1: Overview," SS7 Port Adapter Installation and Configuration, pp. 1-1-1-8 (Publication Date Unknown).
"Configuring ITP Basic Functionality," IP Transfer Point, Cisco IOS Release 12.2(4)MB12, pp. 31-50 (Publication Date Unknown).
"Configuring ITP Optional Features," IP Transfer Point, Cisco IOS Release 12.294)MB12, pp. 65-136 (Publication Date Unknown).
"Configuring M3UA and SUA SS7 Over IP Signaling Gateways," IP Transfer Point, Cisco IOS Release 12.2(4)MB13, pp. 51-66 (Publication Date Unknown).
"Configuring M3UA and SUA SS7 Over IP Signaling Gateways," IP Transfer Point, Cisco IOS Release 12.2(4)MB10, pp. 49-62 (Publication Date Unknown).
Letter regarding Decision to Grant for Chinese Patent Application No. ZL201280009201.3 (Jan. 20, 2017).
Notice of Allowance and Fee(s) Due for U.S. Appl. No. 14/107,818 (dated Dec. 27, 2016).
Applicant Initated Interview Summary for U.S. Appl. No. 14/107,818 (dated Oct. 24, 2016).

(56) References Cited

OTHER PUBLICATIONS

Letter regarding Office Action for Chinese Patent Application No. 201280009801.3 (dated Sep. 19, 2016).
Non-Final Office Action for U.S. Appl. No. 14/107,818 (dated Jul. 5, 2016).
Advisory Action Before the Filing of an Appeal Brief for U.S. Appl. No. 14/107,818 (dated May 26, 2016).
Applicant-Initiated Interview Summary for U.S. Appl. No. 14/107,818 (dated May 24, 2016).
Advisory Action Before the Filing of an Appeal Brief and Applicant-Initiated Interview Summary for U.S. Appl. No. 13/354,149 (dated Apr. 15, 2016).
Notification of the Second Office Action for Chinese Application No. 201280009801.3 (dated Apr. 5, 2016).
Letter Regarding Issued Patent for Japanese Patent Registration No. 5885757 (Mar. 15, 2016).
Final Office Action for U.S. Appl. No. 14/107,818 (dated Feb. 11, 2016).
Letter Regarding Notice of Grant for Japanese Patent Application No. 2013-556855 (Feb. 2, 2016).
Final Office Action for U.S. Appl. No. 13/354,149 (dated Jan. 6, 2016).
Applicant-Initiated Interview Summary for U.S. Appl. No. 13/354,149 (dated Nov. 6, 2015).
Letter regarding Office Action for Japanese Patent Application No. 2013-550580 (dated Oct. 27, 2015).
Notification of the First Office Action for Chinese Application No. 201280009801.3 (dated Jul. 22, 2015).
Pre-Acceptance Notice for Israel Patent Application No. 219214 (dated Apr. 29, 2015).
Letter Regarding Notice of Grant for Chinese Patent Applcation No. ZL201080056996.8 (dated Feb. 12, 2015).
Corrected Notice of Allowability for U.S. Appl. No. 12/906,816 (dated Dec. 2, 2014).
Letter Regarding Notification of Non-Substantial Deficiencies for Israel Patent Application No. 219214 (dated Nov. 17, 2014).
Notice of Allowance and Fee(s) Due for U.S. Appl. No. 12/906,816 (dated Oct. 7, 2014).
Notification of the Second Office Action for Chinese Application No. 201080056996.8 (dated Sep. 3, 2014).
Office Action for Israel Patent Application No. 219214 (dated Jul. 2, 2014).
Non-Final Office Action for U.S. Appl. No. 12/906,816 (dated Jun. 19, 2014).
Applicant-Initiated Interview Summary for U.S. Appl. No. 12/906,816 (dated May 15, 2014).
First Office Action for Chinese Application No. 201080056996.8 (dated Apr. 4, 2014).
Final Office Action for U.S. Appl. No. 12/906,816 (dated Feb. 11, 2014).
Applicant-Initiated Interview Summary for U.S. Appl. No. 12/906,816 (dated Jan. 10, 2014).
Non-Final Office Action for U.S. Appl. No. 12/906,816 (dated Oct. 1, 2013).
Communication of European publication number and information on the application of Article 67(3) EPC for European Application No. 10824243.9 (dated Jul. 25, 2012).
Advisory Action for U.S. Appl. No. 12/906,816 (dated Jun. 5, 2012).
Applicant-Initiated Interview Summary for U.S. Appl. No. 12/906,816 (dated May 17, 2012).
Final Official Action for U.S. Appl. No. 12/906,816 (dated Feb. 21, 2012).
Applicant-Initiated Interview Summary for U.S. Appl. No. 12/906,816 (dated Jan. 27, 2012).
Non-Final Official Action for U.S. Appl. No. 12/906,816 (dated Oct. 5, 2011).
Notification of Transmittal of the International Search Report and the Written Opinion of the International Searching Authority, or the Declaration for International Application No. PCT/US2010/053062 (dated Jun. 28, 2011).
Jones et al., "Diameter Command Code Registration for the Third Generation Partnership Project (3GPP) Evolved Packet System (EPS)," Network Working Group, RFC 5516, pp. 1-5 (Apr. 2009).
Eronen et al., "Diameter Extensible Authentication Protocol (EAP) Application," https://www.ietf.org/rfc/rfc4072.txt, pp. 1-31 (Aug. 2005).
Fajardo, "Open Diameter Routing Architecture," http://diameter.sourceforge.net/diameter-routing/, pp. 1-5 (Jun. 25, 2004).
Non-Final Office Action for U.S. Appl. No. 13/354,149 (dated Jun. 15, 2017).
Extended European Search Report for European Application No. 10824243.9 (dated Jun. 8, 2017).
Corrected Notice of Allowability for U.S. Appl. No. 14/107,818 (dated Apr. 11, 2017).
Extended European Search Report for European Application No. 12737038.5 (dated Mar. 16, 2017).
Notice of Allowance and Fee(s) Due for U.S. Appl. No. 13/354,149 (dated Nov. 24, 2017).
Tairov et al., "Signaling Messages and AVPs for 3P-AAA Framework," 2011 Fifth International Conference on Next Generation Mobile Applications, Services and Technologies, pp. 180-184 (2011).
Wenjing et al., "A new type diameter-transmission mechanism baed on distributed authorization signaling," 2009 Joint Conferences on Pervasive Computing (JCPC), pp. 647-652 (2009).
Congdon et al., "Radius Filter Rule Attribute," RFC 4849, DOI 10.17487/RFC4849, pp. 1-9 (Apr. 2007).
Eyermann et al., "Diameter-based accounting management for wireless services," IEEE Wireless Communications and Networking Conference, pp. 2305-2311 (2006).
Li et al., "A Mobile IPv6 Firewall Traversal Scheme Integrating with AAA," 2006 International Conference on Wireless Communications, Networking and Mobile Computing, pp. 1-6 (2006).
Letter Regarding Japanese Office Action for Japanese Patent Application No. 2015-521880 (Sep. 12, 2017).
Communication under Rule 71(3) EPC for European Application No. 13 820 508.3 (dated Aug. 24, 2017).
Notification of the First Office Action for Chinese Application No. 201380037292.X (dated Aug. 18, 2017).
3 GPP, "LTE; General Packet Radio Service (GPRS) enhancements for Evolved Universal Terrestrial Radio Access Network (E-UTRAN) access (3GPP TS 23.401 V 14.3.0 Release 14),"ETSI TS 123 401 V14.3.0, pp. 1-392 (May 2017).
Letter Regarding Office Action for Japanese Patent Application No. 2015-521880 (dated Mar. 21, 2017).
Communication pursuant to Article 94(3) EPC for European Patent Application No. 13 820 508.3 (dated Feb. 9, 2017).
Communication pursuant to Article 94(3) EPC for European Patent Application No. 13 820 508.3 (dated Nov. 9, 2016).
Notice of Allowance and Fee(s) Due for U.S. Appl. No. 13/942,323 (dated Feb. 5, 2016).
Extended European Search Report for European Application No. 13820508.3 (dated Feb. 3, 2016).
Advisory Action & AFCP 2.0 Decision for U.S. Appl. No. 13/942,323 (dated Oct. 5, 2015).
Letter regarding Decision to Grant for Chinese Patent Application No. ZL201080064945.X (dated Sep. 1, 2015).
Final Office Action for U.S. Appl. No. 13/942,323 (dated Jun. 9, 2015).
"Policy Control & Charging System," http://www.yemenmobile.com.ye/userimages/2015/06.pdf, pp. 1-26 (Jun. 2015)).
Communication under Rule 71(3) EPC for European Patent Application No. 10841576.1 (dated May 7, 2015).
Communication of European Publication Number and Information on the Application of Article 67(3) EPC for European Patent Application No. 13820508.3 (dated Apr. 22, 2015).
Notification of the Second Office Action for Chinese Patent Application No. 201080064945.X (dated Apr. 22, 2015).
Non-Final Office Action for U.S. Appl. No. 13/942,323 (dated Feb. 25, 2015).
3GPP, "3rd Generation Partnership Project; Technical Specification Group Services and System Aspects; Telecommunication management; Charging management; Packet Switched (PS) domain charging (Release 12)," 3GPP TS 32.251 V12.9.0, pp. 1-159 (Mar. 2015).

(56) References Cited

OTHER PUBLICATIONS

3GPP, "3rd Generation Partnership Project; Technical Specification Group Core Network and Terminals; Policy and Charging Control over Np reference point (Release 13)," 3GPP TS 29.217 V1.0.0, pp. 1-20 (Nov. 2014).
First Office Action for Chinese Application No. 201080064945.X (dated Sep. 17, 2014).
European Search Report for European Patent Application No. 10841576.1 (dated May 9, 2014).
Notice of Allowance and Fee(s) Due for U.S. Appl. No. 12/973,228 (dated Mar. 20, 2014).
Notification of Transmittal of the International Search Report and the Written Opinion of the International Searching Authority, or the Declaration for International Application No. PCT/US2013/050512 (dated Dec. 2, 2013).
Non-Final Office Action for U.S. Appl. No. 12/973,228 (dated Oct. 25, 2013).
Commonly-assigned, co-pending International Application No. PCT/US13/50512 for "Methods, Systems, and Computer Readable Media for Dynamically Controlling Congestion in a Radio Access Network," (Unpublished, filed Jul. 15, 2013).
Commonly-assigned, co-pending U.S. Appl. No. 13/942,323 for "Methods, Systems, and Computer Readable Media for Dynamically Controlling Congestion in a Radio Access Network," (Unpublished, filed Jul. 15, 2013).
Final Office Action for U.S. Appl. No. 12/973,228 (dated Jun. 21, 2013).
Non-Final Office Action for U.S. Appl. No. 12/973,228 (dated Feb. 1, 2013).
3 GPP, "3rd Generation Partnership Project; Technical Specification Group Services and System Aspects; Telecommunication management; Charging management; Diameter charging applications (Release 11)," 3GPP TS 32.299 V11.6.0, pp. 1-152 (Dec. 2012).
3GPP, "3rd Generation Partnership Project; Technical Specification Group Services and System Aspects; Policy and charging control architecture (Release 11)," 3GPP TS 23.203 V11.8.0, pp. 1-178 (Dec. 2012).
3GPP, "3rd Generation Partnership Project; Technical Specification Group Core Network and Terminals; Policy and Charging Control (PCC); Reference points (Release 11)," 3GPP TS 29.212 V11.7.0 pp. 1-196 (Dec. 2012).
Communication of European Publication Number and Information on the Application of Article 67(3) EPC for European Patent Application No. 10841576.1 (dated Oct. 10, 2012).
3GPP, "3rd Generation Partnership Project; Technical Specification Group Core Network and Terminals; Policy and Charging Control: Spending Limit Reporting over Sy reference point (Release 11)," 3GPP TS 29.219 V11.2.0 pp. 1-20 (Sep. 2012).
Notification of Transmittal of the International Search Report and the Written Opinion of the Internaional Searching Authirity, or the Declaration for International Patent Application No. PCT/US2010/061586 (dated Sep. 26, 2011).
Tekelec et al., "Discussion paper on Usage-reporting from PCRF to OCS over Sy," 3GPP TSG SA WG2 #86, pp. 1-2 (Jul. 11-15, 2011).
"Smart Cards; Card Application Toolkit (CAT) (Release 9)," ETSI TS 102 223 V9.2.0, pp. 1-209 (Oct. 2010).
3GPP, "3rd Generation Partnership Project; Technical Specification Group GSM/EDGE Radio Access Network; Mobile Radio Interface Layer 3 Specification; Radio Resource Control (RRC) Protocol (Release 10)," 3GPP TS 44.018 V10.0.0, pp. 1-429 (Sep. 2010).
3GPP, "3rd Generation Partnership Project; Technical Specification Group Radio Access Network; Evolved Universal Terrestrial Radio Access (E-UTRA); Radio Resource Control (RRC); Protocol Specification (Release 9)," 3GPP TS 36.331 V9.4.0, pp. 1-252 (Sep. 2010).
3GPP, "3rd Generation Partnership Project; Technical Specification Group Radio Access Network; Radio Resource Control (RRC); Protocol Specification (Release 9)," 3GPP TS 25.331, V9.4.0, pp. 1-1789 (Sep. 2010).
3GPP, "3rd Generation Partnership Project; Technical Specification Group Services and System Aspects; Telecommunication management; Charging management; Charging architecture and principles (Release 8)," 3GPP TS 32.240 V8.6.0, 1-44 (Jun. 2010).
3GPP, "3rd Generation Partnership Project; Technical Specification Group Core Network and Terminals; UICC-terminal Interface; Physical and Logical Characteristics (Release 9)," 3GPP TS 31.101, V9.1.0, pp. 1-35 (Jun. 2010).
3GPP, "3rd Generation Partnership Project; Technical Specification Group Core Network and Terminals; Non-Access-Stratum (NAS) Functions Related to Mobile Station (MS) in Idle Mode (Release 10)," 3GPP TS 23.122 v10.0.0, pp. 1-41 (Jun. 2010).
3GPP, "Universal Mobile Telecommunications System (UMTS); LTE; 3GPP Evolved Packet System (EPS); Evolved General Packet Radio Service (GPRS) Tunnelling Protocol for Control Plane (GTPv2-C); Stage 3 (3GPP TS 29.274 version 9.3.0 Release 9)," ETSI TS 129 274 V9.3.0, pp. 1-162 (Jun. 2010).
"Universal Mobile Telecommunications System (UMTS); LTE; Policy and Charging Control over Gx Reference Point (3GPP TS 29.212 version 9.2.0 Release 9)," ETSI TS 129 212 V9.2.0, pp. 1-115 (Apr. 2010).
3GPP, "3rd Generation Partnership Project; Technical Specification Group Service and System Aspects; Telecommunication management; Charging management; Charging Data Record (CDR) parameter description (Release 9)," 3GPP TS 32.298 V9.2.0, pp. 1-135 (Dec. 2009).
3GPP, "3rd Generation Partnership Project; Technical Specification Group Services and System Aspects; Network Identity and Timezone (NITZ); Service Description, Stage 1 (Release 9)," 3GPP TS 22.042, V9.0.0, pp. 1-8 (Dec. 2009).
Balbás et al., "Policy and Charging Control in the Evolved Packet System," LTE—3GPP Release 8, IEEE Communications Magazine, pp. 68-74 (Feb. 2009).
3GPP, "Digital Cellular Telecommunications System (Phase 2+); Universal Mobile Telecommuncations System (UMTS); Universal Subscriber Identity Module (USIM) Application Toolkit (USAT) (3GPP TS 31.111 version 8.3.0 Release 8)," ETSI TS 131 111 V8.3.0, pp. 1-102 (Oct. 2008).
Hakala et al., "Diameter Credit-Control Application," Network Working Group, RFC 4006, pp. 1-114 (Oct. 2005).
Non-Final Office Action for U.S. Appl. No. 15/494,317 (dated Jun. 7, 2018).
Notice of Grant for Chinese Patent Application Serial No. ZL201380037292.X (dated Feb. 13, 2018).
Pre-Appeal Re-Examination Report for Japanese Patent Application Serial No. JP2015-521880 (dated Jan. 30, 2018).
Detailed Explanation on Procedure for Official Notice and Pre-appeal Re-Examination Report for Japanese Patent Application Serial No. JP2015-521880 (dated Jan. 19, 2018).
Decision to grant a European patent pursuant to Article 97(1) EPC for European Patent Application Serial No. EP13820508.3 (dated Dec. 21, 2017).
Communication pursuant to Article 94(3) EPC for European Patent Application Serial No. 10 824 243.9 (Jun. 11, 2018).

* cited by examiner

METHODS, SYSTEMS, AND COMPUTER READABLE MEDIA FOR COMMUNICATING RADIO ACCESS NETWORK CONGESTION STATUS INFORMATION FOR LARGE NUMBERS OF USERS

TECHNICAL FIELD

The subject matter described herein relates generally to communicating mobile access network congestion status information. More particularly, the subject matter described herein relates to methods, systems, and computer readable media for communicating radio access network congestion status information for large numbers of users.

BACKGROUND

Wireless or mobile network operators can struggle to cope with the data deluge in their networks and to make sure that the wireless spectrum is prioritized to suit their business objectives. The mobile network operator is being pressured both from the increased amount of access (e.g., the rate of growth of smartphone adoption) and the increased amount of data flow (e.g., the rate of growth in data use in the network) in the mobile network.

In some networks, congestion can occur at the radio access network (RAN) used to access a core network. For example, popular events such as music concerts and sporting events can draw large crowds of people into the same physical area. The large numbers of users attempting to use the RAN can cause congestion at the RAN. Users may experience congestion in the form of slow data rates and inability to connect.

The $3^{rd}$ Generation Partnership Project (3GPP) Technical Specification (TS) 29.217 v1.0.0, the disclosure of which is incorporated herein by reference in its entirety, describes and defines the Np interface. The Np interface lies between the RAN congestion awareness function (RCAF) and the policy and charging rules function (PCRF). The technical specification describes a procedure to enable the RCAF to report to the PCRF the congestion state of an evolved nodeB (eNodeB) or group of cells (e.g., a known service area) or a cell for a specific user. If all or a large number of users in the service area are experiencing congestion, the RCAF could potentially overwhelm the PCRF with individual user congestion status reports.

3GPP TS 29.405 v0.3.0 defines and describes the Nq and Nq' interfaces. The Nq interface lies between the RCAF and the mobility management entity (MME). The Nq' interface lies between the RCAF and the serving GPRS support node (SGSN). The technical specification describes a procedure to enable the RCAF to retrieve a list of users and access point names (APNs) for a given congested eNodeB or cell. Reporting congestion status by the RCAF to the PCRF (over Np) using the (TS) 29.217 v1.0.0 list-based procedure requires that every user ID experiencing the congestion be placed either in a separate congestion report message or in an aggregated congestion report message. The formulation and processing of such messages becomes inefficient when tens, hundreds, or even thousands of users in the same service area are experiencing congestion.

Accordingly, in light of these difficulties, there exists a need for methods, systems, and computer readable media for communicating radio access network congestion status information large numbers users.

SUMMARY

The subject matter described herein relates to methods, systems, and computer readable media for communication radio access network congestion status information for large numbers of users. In one example, a method for communicating RAN congestion status information for a large number of users includes steps performed at a policy and charging rules function (PCRF) including one or more processors. The method further includes receiving a user-specific message from an RCAF. The method further includes determining that the user-specific message indicates that one or more eNodeBs or cells or Service Areas monitored by the RCAF is congested for a plurality of users using the one or more eNodeBs or cells or Service Areas for radio access to a telecommunications network. The method further includes, in response to determining that the user-specific message indicates that the one or more eNodeBs or cells or Service Areas are congested, performing one or more actions to mitigate the congestion.

In some examples, receiving the user-specific message comprises receiving RAN user plane congestion information (RUCI). Receiving the user-specific message comprises receiving the RUCI in a non-aggregated-RUCI-report-request (NRR) command on an Np interface. Determining that the user-specific message indicates that the one or more eNodeBs are congested comprises determining that the user-specific message includes a predetermined subscription identifier that identifies all or plural users served by the one or more eNodeBs. Determining that the user-specific message indicates that the one or more eNodeBs are congested comprises determining that a subscription identifier of the user-specific message is a fake identifier.

In some examples, performing one or more actions to mitigate the congestion comprises responding to the RCAF with a request to block one or more new user admissions on the one or more eNodeBs, causing the RCAF to forward the request to a Mobility Management Entity (MME) or a Serving GPRS Support Node (SGSN). Performing one or more actions to mitigate the congestion comprises responding to the RCAF with a request to limit a plurality of new user admissions on the one or more eNodeBs to a specified threshold admittance rate, causing the RCAF to forward the request to an MME or an SGSN. Performing one or more actions to mitigate the congestion at the eNodeB comprises instructing a Packet Data Network Gateway (PGW) over a Gx interface to offload one or more connections served by the one or more eNodeBs to one or more wireless local area networks (WLANs) or to terminate the one or more connections served by the eNodeB. Performing one or more actions to mitigate the congestion comprises instructing an Application Function (AF) over an Rx interface to use reduced bandwidth codecs for one or more connections served by the one or more eNodeBs. Performing one or more actions to mitigate the congestion comprises instructing an Application Function (AF) over an Rx interface to release one or more Rx sessions for users served by the one or more eNodeBs.

According another aspect of the subject matter describe herein, a system for communicating RAN congestion status information for large numbers of users is provided. The system includes a PCRF including one or more processors. The PCRF is configured to cause the one or more processors to perform operations. The operations include receiving, at the PCRF, a user-specific message from an RCAF. The operations further include determining, at the PCRF, that the user-specific message indicates that one or more eNodeBs monitored by the RCAF are congested for a plurality of users using the one or more eNodeBs for radio access to the telecommunications network. The operations further include, in response to determining that the user-specific message indicates that the one or more eNodeBs are congested, performing, at the PCRF, one or more actions to mitigate the congestion.

The methods, systems, and computer readable media for communication RAN congestion status information for large numbers of users can be useful, e.g., in improving the operation of telecommunications network computing equipment. For example, by sending one user-specific message to indicate that multiple users are experiencing congestion instead of multiple messages or multiple user IDs, the telecommunications network computing equipment can operate more efficiently, e.g., by using fewer computing resources or completing certain tasks faster. Moreover, the total amount of traffic on the telecommunications network may be reduced, freeing bandwidth on the telecommunications network for other computing resources.

The subject matter described herein may be implemented in hardware, software, firmware, or any combination thereof. As such, the terms "function", "node" or "module" as used herein refer to hardware, software and/or firmware components for implementing the feature(s) being described. In some examples, the subject matter described herein may be implemented using a non-transitory computer readable medium having stored thereon computer executable instructions that when executed by the processor of a computer cause the computer to perform steps.

Computer readable media suitable for implementing the subject matter described herein include non-transitory computer-readable media, such as disk memory devices, chip memory devices, programmable logic devices, random access memory (RAM), read only memory (ROM), optical read/write memory, cache memory, magnetic read/write memory, flash memory, and application specific integrated circuits. In addition, a computer readable medium that implements the subject matter described herein may be located on a single device or computing platform or may be distributed across multiple devices or computing platforms.

DETAILED DESCRIPTION

Figure 1:
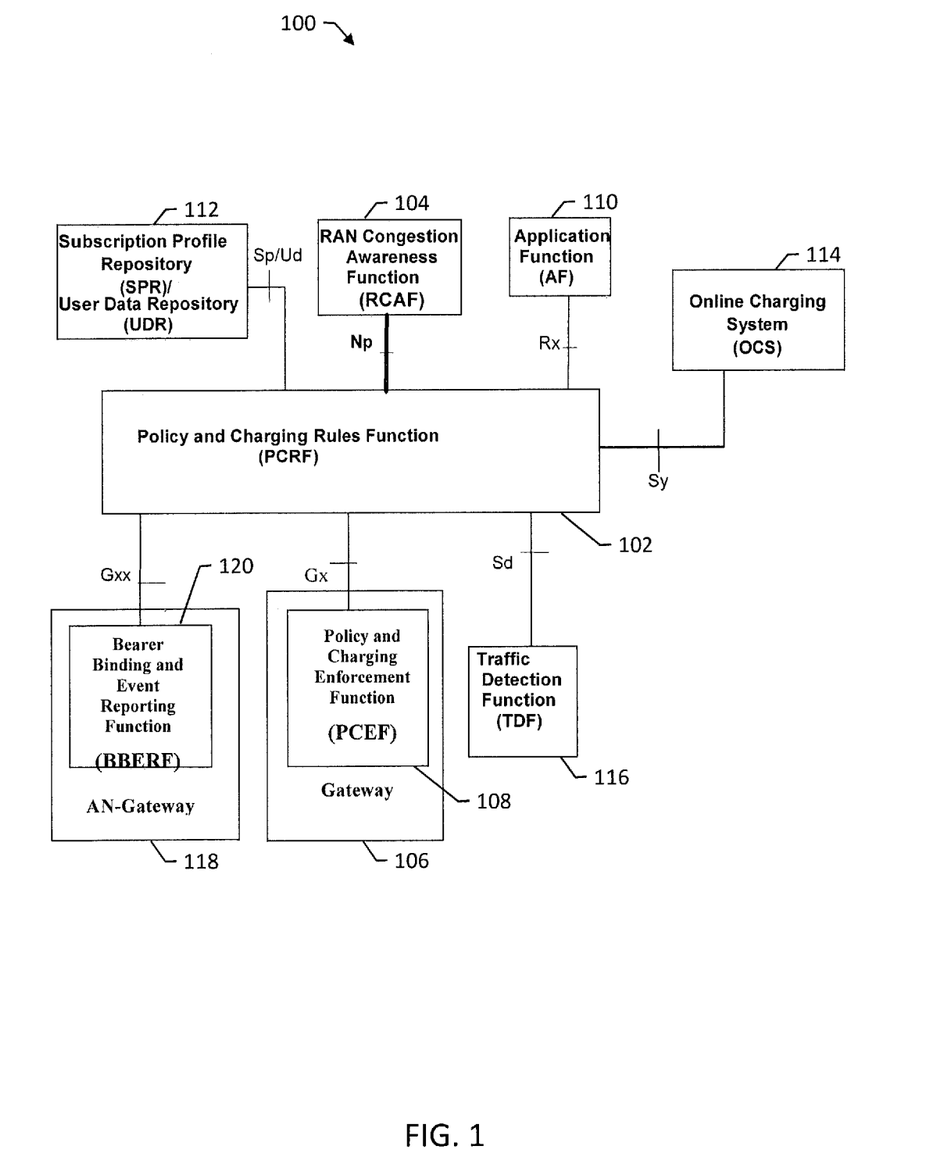
FIG. 1 is a block diagram of a PCRF and various interfaces between the PCRF and other network elements.

FIG. 1 is a block diagram of an example telecommunications network 100 including a PCRF 102 and an RCAF 104 communicating using an Np interface, e.g., as specified by 3GPP TS 29.217 v1.0.0 or any appropriate technical specification.

PCRF 102 may include on or more processors that perform the operations described herein for communicating RAN congestion information for large numbers of users and taking steps to mitigate the congestion. For example, PCRF 102 may be implemented on a computing platform includes one or more processor blades, each implementing a PCRF or other function. PCRF 102 may be implemented in a distributed computing system or any appropriate system of one or more computers. PCRF 102 is part of a 3GPP policy charging control (PCC) architecture. The elements of the PCC provide access, resource, and quality-of-service (QoS) control.

In operation, PCRF 102 functions in real-time or near real-time to determine policy rules in the telecommunication network. PCRF 102 can operate at the network core and access user information and other specialized functions in a centralized manner. PCRF 102 can aggregate information to and from the telecommunications network, operational supports systems, and other sources in real time, which can be useful for the creation of rules and automatically making policy decisions for each user active on the telecommunications network. Using PCRF 102, the telecommunications network can offer multiple services, QoS levels, and charging rules.

In some examples, PCRF 102 provides the ability to manage network and user policy in real time. PCRF 102 can efficiently and dynamically route and prioritize network traffic. PCRF 102 can provide a unified view of user context based on one or more of device, network, location, and billing data. PCRF 102 can provide key inputs to revenue assurance and bandwidth management.

Network 100 includes a PGW 106, which includes a policy and charging enforcement function (PCEF) 108. PGW 106 communicates with PCRF 102 over a Gx interface. PGW 106 can provide connectivity from user equipment to external packet data networks by being the point of exit and entry of traffic for or/and from the user equipment. In some cases, a UE may have simultaneous connectivity with more than one PGW for accessing multiple PDNs. PGW 106 can perform policy enforcement, packet filtering, charging support, packet screening, and the like.

Network 100 includes an AF 110. AF 110 communicates with PCRF 102 over an Rx interface. AF 110 can interact with applications or services that require dynamic PCC. AF 110 can extract session information from an application signal and provide the extracted information to PCRF 102.

Network 100 includes a subscription profile repository (SPR) or user data repository (UDR) 112. PCRF 102 accesses SPR/UDR 112 using an Sp/Ud interface. SPR/UDR 112 stores subscriber/subscription information. For example, the information can be on a per-PDN basis and can include allowed services, allowed QoS, charging related information, and the like.

Network 100 includes an online charging system (OCS) 114. PCRF 102 communicates with OCS 114 using an Sy interface. OCS 114 can be a credit management system for pre-paid charging. In some examples, PCEF 108 interacts with OCS 114 to check out credit and report credit status. Network 100 includes a traffic detection function (TDF) 116. PCRF 102 communicates with TDF 116 using an Sd interface. TDF 116 can enforce traffic policies based on pre-set rules or dynamically determining rules by PCRF 102 on data flows in real-time or near real-time.

Network 100 includes an AN-Gateway (aka Serving Gateway) 118, which includes a bearer binding event reporting function (BBERF) 120. BBERF 120 can map IP flows to bearers. PCRF 102 communicates with AN-Gateway 118 using a Gxx interface. BBERF 120 can receive bearer binding information from PCRF 102.

RCAF 104 reports RUCI via the Np interface to PCRF 102. PCRF 102 can use the RAN user plane congestion status when making policy decisions. In some examples, RUCI includes the following information:

The user identifier (e.g., international mobile subscriber identity (IMSI)) identifying the user equipment (UE) that is impacted by congestion;

The packet data network (PDN) identifier for which congestion information is reported;

Congestion level information (e.g., congestion level value or congestion level set id) of the UE impacted by congestion;

The eNodeB identifier, E-UTRAN cell global identifier (ECGI), or service area identifier (SAI) identifying the eNodeB, E-UTRAN cell, or Service Area, respectively, serving the UE.

RCAF 104 can maintain a context on user-specific basis. The context can be identified by the user identifier, e.g., the IMSI. The context can include the following information:

The previously reported congestion level over the Np reference point;

The reporting restrictions received from PCRF 102 on user-specific, per access point name (APN) basis. The reporting restrictions can be stored by RCAF 104 until PCRF 102 explicitly signals to remove the reporting restrictions.

At the protocol level, the Np interface can be implemented using a Diameter based application. Diameter is an authentication, authorization, and accounting protocol for computer networks. Diameter applications extend the base protocol by adding new commands and/or attributes, e.g., commands and attributes for use with the extensible authentication protocol (EAP). A typical Diameter packet includes a Diameter header and a variable number of attribute-value pairs (AVPs) for encapsulating information relevant to the Diameter message.

PCRF 102 can act as a Diameter server. PCRF 102 acts as a Diameter server because it is the network element that handles the RUCI reporting for a particular realm. RCAF 104 can act as the Diameter client. RCAF 104 acts as a Diameter client because it is the network element reporting the RUCI.

The Np protocol is a user-specific protocol. So notifications made by RCAF 104 or subscriptions to notifications made by PCRF 102 are done on a user-specific basis. In general, messages on the Np protocol are user-specific, i.e., the messages contain a user identifier or are otherwise associated with a particular user. This enables Np to have simplicity and adherence to the generic Diameter framework in a PCC.

RCAF 104 can use two types of RUCI reports on the Np interface for transfer of congestion information from RCAF 104 to PCRF 102: Non-aggregated RUCI reports and aggregated RUCI reports.

For a Non-aggregated RUCI report, RCAF 104 can send an NRR command to PCRF 102 by including the user id within the Subscription-Id AVP, PDN ID within the Called-Station-Id AVP, and a congestion level set id within the Congestion-Level-Set-Id AVP if the reporting restriction was provided earlier or a congestion level value within the Congestion-Level-Value AVP if the reporting restriction was not provided earlier at the command level. RCAF 104 can provide congestion location identifier of the UE within the Congestion-Location-Id AVP in the NRR command. RCAF 104 can also include the RCAF Identity within the RCAF-Id AVP in every NRR command for a specific user id and PDN ID.

The NRR command can have the following message format:

```
<NR-Request> ::= <Diameter Header: xxxxxx, REQ, PXY >
    < Session-Id >
    { Auth-Application-Id }
    { Auth-Session-State }
    { Origin-Host }
    { Origin-Realm }
```

-continued

```
    { Destination-Realm }
    [ Destination-Host ]
    [ Origin-State-Id ]
    [ Subscription-Id ]
    [ Called-Station-Id ]
    [ Congestion-Level-Value ]
    [ Congestion-Level-Set-Id ]
    [ Congestion-Location-Id ]
    [ RCAF-Id ]
    *[ Proxy-Info ]
    *[ Route-Record ]
    *[ Supported-Features ]
    *[ AVP ]
```

Once PCRF 102 receives the NRR command, PCRF 102 stores the related information and responds with a Non-aggregated RUCI Report Answer (NRA) command including the PCRF ID within the PCRF-Address AVP. PCRF 102 can use the RUCI received from RCAF 104 as input for policy decisions. When RCAF 104 receives the NRA command, RCAF 104 can store the PCRF ID in the UE context for this specific user ID together with the PDN ID for further aggregated RUCI report.

The NRA command can have the following format:

```
<NR-Answer> ::= < Diameter Header: xxxxxx, PXY >
    < Session-Id >
    { Auth-Application-Id }
    { Auth-Session-State }
    { Origin-Host }
    { Origin-Realm }
    [ Result-Code ]
    [ Experimental-Result ]
    [ Error-Message ]
    [ Error-Reporting-Host ]
    *[ Failed-AVP ]
    [ Reporting-Restriction ]
    [ RUCI-Action ]
    *[ Congestion-Level-Definition ]
    [ PCRF-Address ]
    [ Origin-State-Id ]
    *[ Redirect-Host ]
    [ Redirect-Host-Usage ]
    [ Redirect-Max-Cache-Time ]
    *[ Proxy-Info ]
    *[ Supported-Features ]
    *[ AVP ]
```

If the ReportRestriction feature is both supported by RCAF 104 and PCRF 102, then PCRF 102 may specify or modify report restriction by including one or more Congestion-Level-Definition AVP(s) including the defined congestion level set within the Congestion-Level-Set-Id AVP and corresponding congestion level(s) within the Congestion-Level-Range AVP. PCRF 102 can remove the reporting restrictions by including the Reporting-Restriction AVP set to 0 if the reporting restrictions were provisioned earlier. PCRF 102 can stop RUCI reporting if previously enabled, e.g., by including the RUCI-Action AVP set to 0 (Disable RUCI Reporting), or enable the RUCI Reporting if previously disabled, by including the RUCI-Action AVP set to 1 (Enable RUCI Reporting) in the NRA command.

For an Aggregated RUCI report, RCAF 104 aggregates the RUCIs of different user IDs and PDN IDs that have PCRF 102 as a destination. RCAF 104 can send an Aggregated RUCI Report Request (ARR) command to PCRF 102 by including the PCRF ID within the Destination-Host AVP. RCAF 104 can include one or more Aggregated-RUCI-Report AVP with a congestion level set id within the Congestion-Level-Set-Id AVP if the reporting restriction was provided earlier or a congestion level value within the Congestion-Level-Value AVP if the reporting restriction was not provided earlier. RCAF 104 can include the PDN ID within the Called-Station-ID AVP and the user ID list in the Subscription-Id AVPs.

The ARR command can have the following message format:

```
<AR-Request> ::= <Diameter Header: xxxxxx, REQ, PXY >
    < Session-Id >
    { Auth-Application-Id }
    { Auth-Session-State }
    { Origin-Host }
    { Origin-Realm }
    { Destination-Realm }
    [ Destination-Host ]
    [ Origin-State-Id ]
    *[ Aggregated-RUCI-Report ]
    *[ Proxy-Info ]
    *[ Route-Record ]
    *[ Supported-Features ]
    *[ AVP ]
```

Once PCRF 102 receives the ARR command, PCRF 102 can store the related information and respond with an Aggregated RUCI Report Answer (ARA) command. PCRF 102 can use the RUCI received from RCAF 104 as input for policy decisions.

The ARA command can have the following message format:

```
<AR-Answer> ::= < Diameter Header: xxxxxx, PXY >
    < Session-Id >
    { Auth-Application-Id }
    { Auth-Session-State }
    { Origin-Host }
    { Origin-Realm }
    [ Result-Code ]
    [ Experimental-Result ]
    [ Error-Message ]
    [ Error-Reporting-Host ]
    *[ Failed-AVP ]
    [ Origin-State-Id ]
    *[ Redirect-Host ]
    [ Redirect-Host-Usage ]
    [ Redirect-Max-Cache-Time ]
    *[ Proxy-Info ]
    *[ Supported-Features ]
    *[ AVP ]
```

When a cell or a service area or an eNodeB is congested, the cell or the service area or the eNodeB is likely to be congested for all users who are served by the cell or the service area or the eNodeB. The cell or the service area or the eNodeB may be congested equally for all users who are served by the cell. In these cases, RCAF 104 can send an ARR command with user IDs for the affected users, but such a message may have a very large size. A very large message may lead to performance issues in network 100.

Reporting congestion status for a cell or a service area or an eNodeB on a system basis by sending a single congestion notification to PCRF 102 may be more efficient than repeating a similar report for a large number of users or sending an aggregated report with a large number of user IDs. RCAF 104 can report congestion, or clear of congestion, for a cell or a service area or an eNodeB by sending a message in a special format understood by both RCAF 104 and PCRF 102 to indicate congestion status for some or all of the users in a cell or a service area or an eNodeB.

For example, RCAF 104 can send an NRR message without indicating any specific user, so that the NRR message includes a predetermined subscription identifier that identifies all or plural users served by the one or more eNodeBs. In another example, RCAF 104 can an NRR message with a pseudo user ID. A pseudo user ID can be, e.g., a user ID that is not present on a list of valid user IDs.

PCRF 102 determines that the NRR message, by virtue of lacking a specific user ID or having a pseudo user ID, indicates that some or all of the users served by the cell or a service area or an eNodeB are experiencing congestion, without having to send a list of each user ID served by the cell or a service area or an eNodeB. In some examples, the NRR message can apply to a single eNodeB or a service area or a cell.

RCAF 104 can periodically check one or more eNodeBs or a service area or a cell to determine whether or not the eNodeBs or a service area or a cell are experiencing congestion. For example, RCAF 104 can poll the eNodeBs or a service area or a cell at regular time intervals or in response to certain events occurring within network 100. RCAF 104 can use any appropriate technique to check the eNodeBs, e.g., by polling the eNodeBs or subscribing to status feeds from the eNodeBs or by otherwise monitoring the eNodeBs.

In this specification, RCAF 104 will be described with respect to one or more eNodeBs for purposes of illustration. The references to the one or more eNodeBs can also apply to a group of eNodeBs, to a cell, or to a service area. Similarly, any reference to a cell or a service area can apply to a group of eNodeBs. Generally, RCAF 104 checks for congestion in a radio access network and reports congestion for some set of equipment in the radio access network, and the set of equipment can be one or more eNodeBs, which can comprise a cell or a service area.

RCAF 104 can determine that one or more eNodeBs are experiencing congestion, so that some or all connected users are likely experiencing congestion, using any appropriate metric for determining a level of congestion or a level of consumption of computing resources and data transmission resources. For example, RCAF 104 can determine that an eNodeB is congested, so that some or all connected users are experiencing congestion, when a number of users connected to the eNodeB is greater than a specified tolerable number of users for the eNodeB.

In another example, RCAF 104 can determine that an eNodeB is congested, so that some or all connected users are experiencing congestion, when an amount of network traffic passing through the node is greater than a specified tolerable amount of network traffic. In another example, RCAF 104 can determine that an eNodeB is congested, so that some or all connected users are experiencing congestion, when one or more user data rates for users connected to the eNodeB and communicating data through the eNodeB drop below a threshold user data rate.

RCAF 104 can, in some examples, select PCRF 102 from a number of available PCRFs. The selection can be based on load balancing or any appropriate algorithm available to RCAF 104. In some examples, some available PCRFs are programmed to recognize the specialized message indicating congestion and some available PCRFs are not programmed to recognize the specialized message indicating congestion. In those examples, RCAF 104 selects PCRF 102 from the available PCRFs that are programmed to recognize the specialized message indicating congestion.

In response to determining that some or all of the users served by the one or more eNodeBs are experiencing congestion, PCRF 102 can take one or more actions to mitigate the congestion. PCRF 102 can select the one or more actions based on policies and/or other conditions, e.g., load on other neighbor eNodeBs. In some examples, PCRF 102 can take certain actions in case PCRF 102 has location information for the eNodeBs, and PCRF 102 can take different actions in case PCRF 102 lacks the location information.

For example, PCRF 102 can instruct the PGW 106 over a Gx interface to offload one or more connections served by the one or more eNodeBs to one or more WLANs. Offloading connections to WLANS can mitigate congestion by causing network traffic that previously passed through the RAN to go through the WLANs. Some of those WLANs may be undesirable in normal circumstances, e.g., where the eNodeBs provide faster data rates when they are not congested, but those WLANs can become desirable when the eNodeBs are congested and the WLANs are operating normally.

In another example, PCRF 102 can instruct the PGW 106 over a Gx interface to terminate one or more connections served by the one or more eNodeBs. Although terminating connections is typically not desirable, PCRF 102 may determine that terminating the connections is the correct policy in some limited circumstances. In some cases, connections can be terminated based on subscriber tiers, e.g., so that subscribers in lower tiers have their connections terminated before subscribers in higher tiers. Subscribers in the lower tiers can elect to subscriber to a higher tier to avoid these kinds of terminations.

In another example, PCRF 102 can instruct AF 110 over an Rx interface to take actions to reduce network usage, e.g., to use reduced bandwidth codecs for some or all of the Rx sessions for users on the congested eNodeBs. AF 110 can use any appropriate technique to reduce network usage to mitigate the congestion. In another example, PCRF 102 can instruct the AF over an Rx interface to release one or more Rx sessions for users served by the congested eNodeBs.

Other examples of actions that the PRCF can take to mitigate the congestion are described below with reference to FIG. 2. For purposes of illustration, the system architecture for roaming has not been described in this specification. The system architecture for roaming is described in 3GPP TS 29.217 v1.0.0.

PCRF 102 can instruct RCAF 104 to limit its congestion reporting to a congestion level. For example, PCRF 102 can instruct RCAF 104 to send congestion reports only when a detected congestion level crosses a threshold level, e.g., level #4, which is severe enough to warrant reporting. PCRF 102 can send such an instruction by sending an MUR command or an NRA command, which are defined respectively in TS 29.2174 sections 4.4.2 (MUR) and 4.4.1.2 (NRA). For example, PCRF 102 can send a MUR command and set:
  1. Reporting-Restriction AVP to a value of 1;
  2. Congestion-Level-Definition AVP to the desired threshold (minimal level or a range of levels); and
  3. RUC-Action to a value of 1.

PCRF 102 can also be configured to provision congestion level restriction on a cell, eNodeB, or service area level. Similar to how RCAF 104 can send eNodeB level reports, PCRF 102 can restrict or fine-tune the amount of the expected reports by sending RCAF 104 an MUR or NRA on a cell, eNodeB, or service area level. For example, PCRF 102 can be configured to do so by omitting the subscription-ID or including a pseudo identifier, e.g., as described above with reference to RCAF 104 sending congestion reports. In addition, PCRF 102 can omit a value for Celled-Station-Id in the MUR or NRA message (command). This can provide another level of granularity in provisioning the restrictions on the expected/desired reports (e.g., pdn level for all users in a specific cell, eNodeB, or service area).

Figure 2:
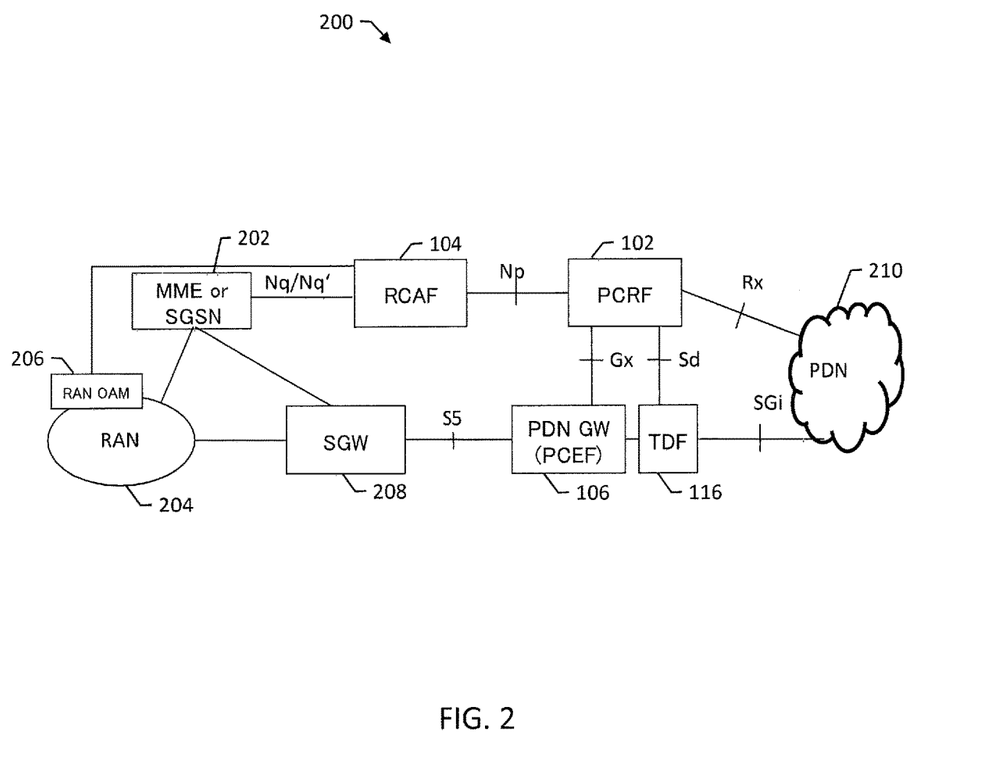
FIG. 2 is a block diagram of a telecommunications network.

FIG. 2 is a block diagram of a telecommunications network 100 illustrating additional network components that a not illustrated in FIG. 1. In FIG. 2, network 100 includes an MME and an SGSN 202 that communicates with RCAF 104 over an Nq or Nq' interface. Network 100 also includes a RAN 204, a RAN operations administration and maintenance (OAM) 206, and a serving gateway (SGW) 208.

MME 202 can be responsible for idle mode UE paging and tagging procedure including retransmissions. MME 202 can be involved in the bearer activation/deactivation process and can be responsible for choosing SGW 208 for a UE at the initial attach and at time of intra-LTE handover involving core network (CN) node relocation.

MME 202 can be responsible for authenticating the user. The non access stratum (NAS) signaling terminates at MME 202, and MME 202 can be responsible for generation and allocation of temporary identities to UEs. MME 202 can check the authorization of the UE to camp on the service provider's public land mobile network (PLMN) and enforces UE roaming restrictions. MME 202 can be the termination point in the network for ciphering/integrity protection for NAS signaling and can handle the security key management.

SGSN 202 is responsible for the delivery of data packets to and from the mobile stations within its geographic service area. SGSN 202 performs tasks including packet routing and transfer, mobility management (attach/detach and location management), logical link management, and authentication and charging functions. The location register of the SGSN can store location information (e.g., current cell, current VLR) and user profiles (e.g., IMSI, address(es) used in PDN 210). of GPRS users registered with SGSN 202.

SGW 208 routes and forwards user data packets, while also acting as the mobility anchor for the user plane during inter-eNodeB handovers and as the anchor for mobility between LTE and other 3GPP technologies. For idle state UEs, SGW 208 terminates the downlink data path and triggers paging when downlink data arrives for the UE.

PCRF 102, in performing one or more actions to mitigate the congestion at one or more eNodeBs, can respond to RCAF 104 with a request to block one or more new user admissions on the eNodeB, causing RCAF 104 to forward the request to MME or SGSN 202. MME or SGSN 202 can then carry out the request by blocking the new user admissions at RAN 204. Blocking new user admissions can prevent new users from being disappointed by the congestion and can eventually relieve the congestion.

PCRF 102, in performing one or more actions to mitigate the congestion at one or more eNodeBs, can respond to RCAF 104 with a request to limit some number of new user admissions on the eNodeB to a specified threshold admittance rate, causing RCAF 104 to forward the request to MME or SGSN 202. MME or SGSN 202 can then carry out the request by limiting the new user admission at RAN 204. Limiting new user admission can prevent new users from being disappoint by the congestion, and can eventually relieve the congestion.

Figure 3:
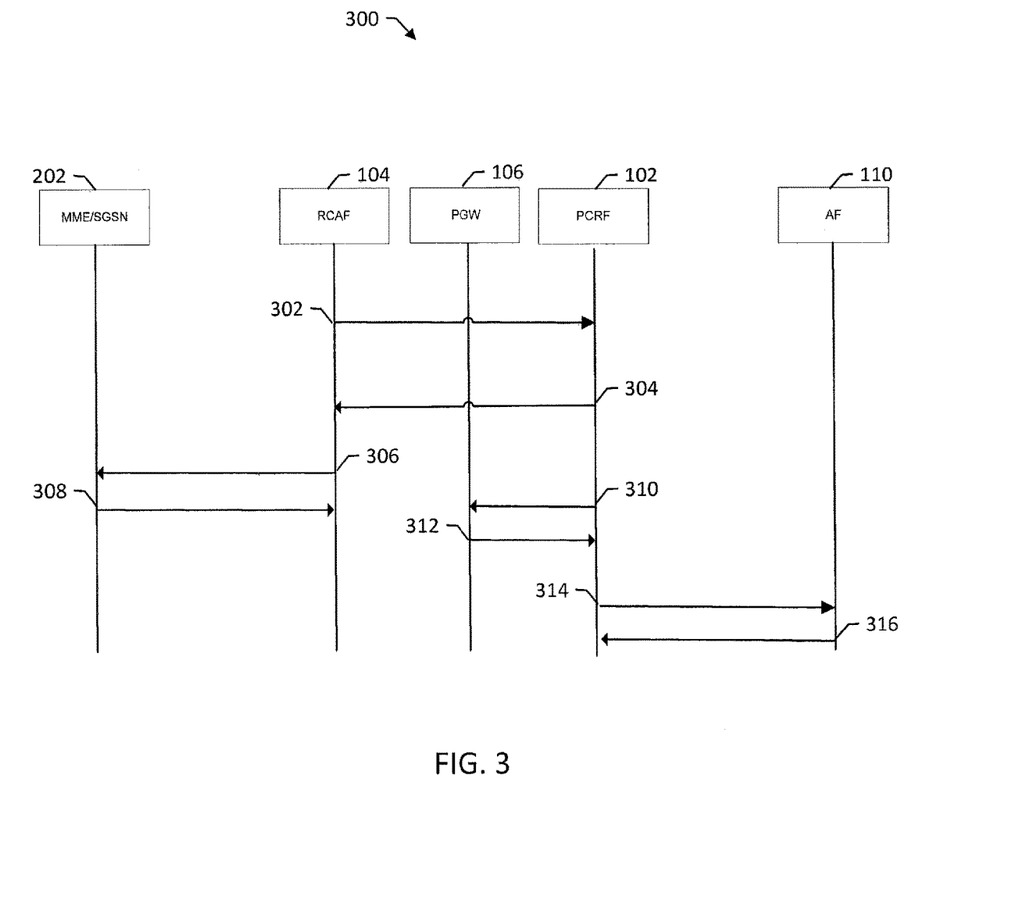
FIG. 3 is a messaging diagram illustrating a series of messages exchanged in a telecommunications system to mitigate congestion in a radio access network.

FIG. 3 is a messaging diagram 300 illustrating a series of messages exchanged in a telecommunications system to mitigate congestion in a radio access network.

The series of messages begins with RCAF 104 sending an NRR message 302 to PCRF 102. RCAF 104 sends NRR message 302 in response to determining that one or more eNodeBs are experiencing congestion.

NRR message 302 is a user-specific message, but NRR message 302 has been formatted by RCAF 104 to indicate to PCFR 102 an amount of congestion for a number of users or perhaps all of the users of one or more eNodeBs. PCRF 102 responds by sending a NRA message 304 to acknowledge NRR message 302.

The following table illustrates an example NRR message 302 by showing AVP names in the left column and values in the right column:

| AVP | Value |
| --- | --- |
| Session-Id | Np.op.com; 1876543210; 102 |
| Origin-Host | rcaf.op.com |
| Destination-Host | pcrf.op.com |
| Origin-Realm | op.com |
| Destination-Realm | op.com |
| Auth-Application-Id | xxxx |
| Congestion-level-Value | 1 // congested |
| Congestion-Location-Id | cell 1 |

RCAF 104 omits a specific user identifier in NRR message 302. The lack of a specific user identifier indicates to PCRF 102 that one or more cells are affected by congestion and/or that some or all of the users connecting to one or more cells are experiencing congestion. In NRR message 302, the Congestion-Location-Id AVP is set to "cell 1," which is an example cell that is experiencing congestion. So NRR message 302 indicates to PCRF 102 that cell 1 is experiencing congestion, e.g., that some or all of the users in cell 1 are experiencing congestion.

The following table illustrates a different example NRR message 302 by showing AVP names in the left column and values in the right column:

| AVP | Value |
| --- | --- |
| Session-Id | Np.op.com; 1876543210; 102 |
| Origin-Host | rcaf.op.com |
| Destination-Host | pcrf.op.com |
| Origin-Realm | op.com |
| Destination-Realm | op.com |
| Auth-Application-Id | xxxx |
| Subscription-Id | Pseudo user id |
| Congestion-Level-Value | 1 // congested |
| Congestion-Location-Id | eNodeB 1 |

RCAF 104 includes a pseudo user identifier in NRR message 302. The pseudo user identifier indicates to PCRF 102 that one or more eNodeBs are affected by congestion and/or that some or all of the users connecting to one or more eNodeBs are experiencing congestion. In NRR message 302, the Congestion-Location-Id AVP is set to "eNodeB 1," which is an example eNodeB that is experiencing congestion. So NRR message 302 indicates to PCRF 102 that eNodeB 1 is experiencing congestion, e.g., that some or all of the users connected to eNodeB 1 are experiencing congestion.

The following table illustrates NRA message 304 to acknowledge NRR message 302. The column on the left lists AVP names and the column on the right lists corresponding AVP values.

| AVP | Description |
| --- | --- |
| Session-Id | Np.op.com; 1876543210; 102 |
| Result-Code | DIAMETER_SUCCESS (2001) |
| Origin-Host | pcrf.op.com |
| Origin-Realm | op.com |
| Auth-Application-Id | xxxx |

In addition to sending NRA message 304, PCRF 102 takes one or more actions to mitigate the congestion at the one or more eNodeBs. PCRF 102 can take any appropriate action for the telecommunications network in view of network policy and rules. The follow three exchanges illustrate example actions that PCRF 102 can perform to mitigate congestion.

PCRF 102 can send a policy request message 306 to MME/SGSN 202 by way of RCAF 104 or by way of any other appropriate path. PCRF 102 can include the policy request with NRA 304. RCAF 104 can send policy request message 306 over a Gq or Gq' interface. Policy request message 306 can indicate that MME/SGSN 202 should block all or some of new user attachments.

MME/SGSN 102 sends a policy answer message 308 to RCAF 104. RCAF 104 can forward policy answer message 308 back to PCRF 102 so PCRF 102 can confirm that the policy is being carried out in making other policy decisions.

PCRF 102 can send a Re-Auth-Request (RAR) message 310 to PGW 106. PCRF 102 can send RAR message 310 over a Gx interface. RAR message 310 includes one or more routing rules. The routing rules can include rules for, e.g., routing or offloading one or more users or a some of the users' network traffic to one or more WLANs.

PGW 106 responds to RAR message 310 with a Re-Auth-Ack (RAA) message 312 to PCRF 102. PCRF 102 can confirm that the routing rules are being carried out in making other policy decisions.

PCRF 102 can send a different RAR message 314 to AF 110. PCRF 102 can send RAR message 314 over a Rx interface. RAR message 314 includes rules for limiting network traffic at AF 110. For example, the rules can include instructions for using limited bandwidth codecs or for otherwise throttling or terminating connections. In some examples, the Rx interface is enhanced to support these instructions, which can be useful to support an overall solution to congestion issues.

AF 110 responds to RAR message 314 with a RAA message 316 to PCRF 102. PCRF 102 can confirm that the rules for AF 110 are being carried out in making other policy decisions.

Figure 4:
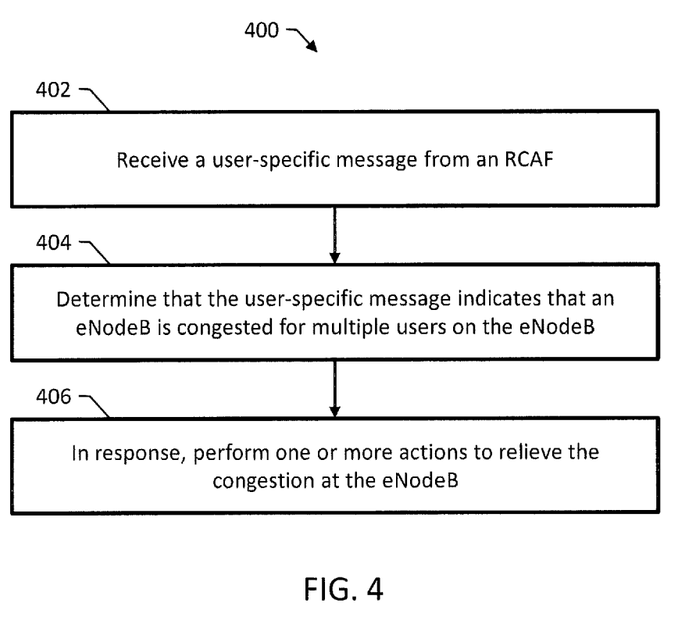
FIG. 4 is a flow diagram of an example method for communicating congestion status for a plurality of users to a PCRF and for acting to mitigate the congestion.

FIG. 4 is a flow diagram of an example method 400 for determining congestion status. The method 400 can be performed by a PCRF, e.g., PCRF 102 of FIG. 1. For purposes of illustration, the method 400 will be described with respect to a PCRF that performs the method 400.

The PCRF receives a user-specific message from an RCAF for the telecommunications network (402). Receiving the user-specific message can include receiving RUCI in an NRR command on an Np interface.

The PCRF determines that the user-specific message indicates that one or more eNodeBs monitored by the RCAF is congested for a plurality of users using the eNodeBs for radio access to the telecommunications network (404). Determining that the user-specific message indicates that the one or more eNodeBs are congested can include determining that the user-specific message lacks a subscription identifier. Determining that the user-specific message indicates that the one or more eNodeBs are congested can include determining that a subscription identifier of the user-specific message is a pseudo identifier.

In response to determining that the user-specific message indicates that the one or more eNodeBs are congested, the PCRF performs one or more actions to mitigate the congestion (406). Performing one or more actions to mitigate the congestion can include responding to the RCAF with a request to block one or more new user admissions on the one or more eNodeBs, causing the RCAF to forward the request to an MME or an SGSN. Performing one or more actions to mitigate the congestion comprises responding to the RCAF with a request to limit a plurality of new user admissions on the one or more eNodeBs to a specified threshold admittance rate, causing the RCAF to forward the request to an MME or an SGSN.

Performing one or more actions to mitigate the congestion at the eNodeB can include instructing a Packet Data Network Gateway (PGW) over a Gx interface to offload one or more connections served by the one or more eNodeBs to one or more WLANs or to terminate the one or more connections served by the eNodeB. Performing one or more actions to mitigate the congestion can include instructing an AF over an Rx interface to use reduced bandwidth codecs for one or more connections served by the one or more eNodeBs. Performing one or more actions to mitigate the congestion can include instructing an AF over an Rx interface to release one or more Rx sessions for users served by the one or more eNodeBs.

Accordingly, while the methods, systems, and computer readable media have been described herein in reference to specific embodiments, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein.

Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

The subject matter described herein is implemented on special purpose computers, such as PCRFs and RCAFs, and improves the functionality of both PRCFs and RCAFs by enabling more efficient congestion status information for large numbers of users. Rather than requiring multiple messages reporting congestion status for individual users or messages with lists of users experiencing congestion, the subject matter described herein enables a single message with a single identifier to be used to communicate congestion status information for a plural users experiencing congestion in a RAN. Such efficient communication is an improvement over Np interface specifications which specify messages for communicating individual user congestion status or congestion status for lists of user identifiers contained in a message.

It is understood that various details of the presently disclosed subject matter may be changed without departing from the scope of the presently disclosed subject matter.

Furthermore, the foregoing description is for the purpose of illustration only, and not for the purpose of limitation.

What is claimed is:

1. A method for communicating radio access network (RAN) congestion status information for a large number of users, the method comprising:
   at a policy and charging rules function (PCRF) including one or more processors:
      receiving a user-specific message from a radio access network (RAN) congestion awareness function (RCAF), wherein the user-specific message is user-specific by virtue of being formatted according to a protocol for specifying a specific user equipment identifier in a message field designated by the protocol for only one user equipment identifier, wherein receiving the user-specific message comprises receiving RAN user plane congestion information (RUCI) in a non-aggregated-RUCI-report-request (NRR) command on an Np interface;
      determining, as a result of a predetermined value being in the message field designated by the protocol for only one user equipment identifier, that the user-specific message indicates that one or more evolved nodeBs (eNodeBs) monitored by the RCAF are congested for a plurality of users using the one or more eNodeBs for radio access to a telecommunications network, wherein determining that the user-specific message indicates that one or more eNodeBs monitored by the RCAF are congested for a plurality of users comprises determining that a Subscription-Id attribute value pair (AVP) of the NRR command contains the predetermined value; and
      in response to determining that the user-specific message indicates that the one or more eNodeBs are congested, performing one or more actions to mitigate the congestion.

2. The method of claim 1, wherein determining that the user-specific message indicates that the one or more eNodeBs are congested comprises determining that the user-specific message includes a predetermined subscription identifier that identifies all or plural users served by the one or more eNodeBs.

3. The method of claim 1, wherein determining that the user-specific message indicates that the one or more eNodeBs are congested comprises determining that a subscription identifier of the user-specific message is a pseudo identifier.

4. The method of claim 1, wherein performing one or more actions to mitigate the congestion comprises responding to the RCAF with a request to block one or more new user admissions on the one or more eNodeBs, causing the RCAF to forward the request to a mobility management entity (MME) or a serving GPRS support node (SGSN).

5. The method of claim 1, wherein performing one or more actions to mitigate the congestion comprises responding to the RCAF with a request to limit a plurality of new user admissions on the one or more eNodeBs to a specified threshold admittance rate, causing the RCAF to forward the request to a mobility management entity (MME) or a serving GPRS support node (SGSN).

6. The method of claim 1, wherein performing one or more actions to mitigate the congestion at the eNodeB comprises instructing a packet data network gateway (PGW) over a Gx interface to offload one or more connections served by the one or more eNodeBs to one or more wireless local area networks (WLANs) or to terminate the one or more connections served by the one or more eNodeBs.

7. The method of claim 1, wherein performing one or more actions to mitigate the congestion comprises instructing an application function (AF) over an Rx interface to use reduced bandwidth codecs for one or more connections served by the one or more eNodeBs.

8. The method of claim 1, wherein performing one or more actions to mitigate the congestion comprises instructing an application function (AF) over an Rx interface to release one or more Rx sessions for users served by the one or more eNodeBs.

9. A system for communicating radio access network (RAN) congestion status information for large numbers of users, the system comprising:
one or more processors; and
a policy and charging rules function (PCRF) implemented on the one or more processors; and
wherein the PCRF is configured to cause the one or more processors to perform operations comprising:
receiving, at the PCRF, a user-specific message from a radio access network (RAN) congestion awareness function (RCAF), wherein the user-specific message is user-specific by virtue of being formatted according to a protocol for specifying a specific user equipment identifier in a message field designated by the protocol for only one user equipment identifier, wherein receiving the user-specific message comprises receiving RAN user plane congestion information (RUCI) in a non-aggregated-RUCI-report-request (NRR) command on an Np interface;
determining, at the PCRF and as a result of a predetermined value being in the message field designated by the protocol for only one user equipment identifier, that the user-specific message indicates that one or more evolved nodeBs (eNodeBs) monitored by the RCAF are congested for a plurality of users using the one or more eNodeBs for radio access to a telecommunications network, wherein determining that the user-specific message indicates that one or more eNodeBs monitored by the RCAF are congested for a plurality of users comprises determining that a Subscription-Id attribute value pair (AVP) of the NRR command contains the predetermined value; and
in response to determining that the user-specific message indicates that the one or more eNodeBs are congested, performing, at the PCRF, one or more actions to mitigate the congestion.

10. The system of claim 9, wherein determining that the user-specific message indicates that the one or more eNodeBs are congested comprises determining that the user-specific message includes a predetermined subscription identifier that identifies all or plural users served by the one or more eNodeBs.

11. The system of claim 9, wherein determining that the user-specific message indicates that the one or more eNodeBs are congested comprises determining that a subscription identifier of the user-specific message is a pseudo identifier.

12. The system of claim 9, wherein performing one or more actions to mitigate the congestion comprises responding to the RCAF with a request to block one or more new user admissions on the one or more eNodeBs, causing the RCAF to forward the request to a mobility management entity (MME) or a serving GPRS support node (SGSN).

13. The system of claim 9, wherein performing one or more actions to mitigate the congestion at the one or more eNodeBs comprises responding to the RCAF with a request to limit a plurality of new user admissions on the one or more eNodeBs to a specified threshold admittance rate, causing the RCAF to forward the request to a mobility management entity (MME) or a serving GPRS support node (SGSN).

14. The system of claim 9, wherein performing one or more actions to mitigate the congestion comprises instructing a packet data network gateway (PGW) over a Gx interface to offload one or more connections served by the one or more eNodeBs to one or more wireless local area networks (WLANs) or to terminate the one or more connections served by the one or more eNodeBs.

15. The system of claim 9, wherein performing one or more actions to mitigate the congestion comprises instructing an application function (AF) over an Rx interface to use reduced bandwidth codecs for one or more connections served by the one or more eNodeBs.

16. The system of claim 9, wherein performing one or more actions to mitigate the congestion comprises instructing an application function (AF) over an Rx interface to release one or more Rx sessions for users served by the one or more eNodeBs.

17. A non-transitory computer readable medium having stored thereon executable instructions that when executed by one or more computers control the one or more computers to perform operations comprising:
at a policy and charging rules function (PCRF) including one or more processors:
receiving a user-specific message from a radio access network (RAN) congestion awareness function (RCAF), wherein the user-specific message is user-specific by virtue of being formatted according to a protocol for specifying a specific user equipment identifier in a message field designated by the protocol for only one user equipment identifier, wherein receiving the user-specific message comprises receiving RAN user plane congestion information (RUCI) in a non-aggregated-RUCI-report-request (NRR) command on an Np interface;
determining, as a result of a predetermined value being in the message field designated by the protocol for only one user equipment identifier, that the user-specific message indicates that one or more evolved nodeBs (eNodeBs) monitored by the RCAF are congested for a plurality of users using the one or more eNodeBs for radio access to a telecommunications network, wherein determining that the user-specific message indicates that one or more eNodeBs monitored by the RCAF are congested for a plurality of users comprises determining that a Subscription-Id attribute value pair (AVP) of the NRR command contains the predetermined value; and
in response to determining that the user-specific message indicates that the one or more eNodeBs are congested, performing one or more actions to mitigate the congestion.

\* \* \* \* \*

UNITED STATES PATENT AND TRADEMARK OFFICE
CERTIFICATE OF CORRECTION

PATENT NO. : 10,117,127 B2
APPLICATION NO. : 14/794369
DATED : October 30, 2018
INVENTOR(S) : Baniel et al.

It is certified that error appears in the above-identified patent and that said Letters Patent is hereby corrected as shown below:

On the Title Page

On page 3, Column 2, under Other Publications, Line 8, delete "Apects;" and insert -- Aspects; --, therefor.

On page 4, Column 1, under Other Publications, Line 13, delete "Searchig Aughtority," and insert -- Searching Authority, --, therefor.

On page 4, Column 1, under Other Publications, Line 32, delete "ISM," and insert -- IMS, --, therefor.

On page 4, Column 1, under Other Publications, Line 53, delete "Telecommnication" and insert -- Telecommunication --, therefor.

On page 4, Column 1, under Other Publications, Line 54, delete "Mangement;" and insert -- Management; --, therefor.

On page 4, Column 2, under Other Publications, Line 25, delete "Foce," and insert -- Force, --, therefor.

On page 4, Column 2, under Other Publications, Line 33, delete "Seervices" and insert -- Services --, therefor.

On page 4, Column 2, under Other Publications, Line 45, delete "Nesxt" and insert -- Next --, therefor.

On page 5, Column 1, under Other Publications, Line 15, delete "(Copyrigh" and insert -- (Copyright --, therefor.

On page 5, Column 1, under Other Publications, Line 38, delete "(Copyrigh" and insert -- (Copyright --, therefor.

On page 5, Column 2, under Other Publications, Line 1, delete "SCCP—Usser" and insert Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*

-- SCCP—User --, therefor.

On page 5, Column 2, under Other Publications, Line 2, delete "Enginnering" and insert
-- Engineering --, therefor.

On page 7, Column 1, under Other Publications, Line 49, delete "Internaional Searching Authirity,"
and insert -- International Searching Authority, --, therefor.

On page 7, Column 2, under Other Publications, Line 42, delete "Telecommuncations" and insert
-- Telecommunications --, therefor.